US009739907B2

(12) United States Patent
Camp et al.

(10) Patent No.: US 9,739,907 B2
(45) Date of Patent: Aug. 22, 2017

(54) OPTIMIZING A GRID FOR FINITE ELEMENT SOLUTIONS FOR SUBTERRANEAN REGION SIMULATIONS

(71) Applicant: Halliburton Energy Services, Inc., Houston, TX (US)

(72) Inventors: Joshua L. Camp, Pearland, TX (US); Avi Lin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/108,730

(22) PCT Filed: Feb. 3, 2015

(86) PCT No.: PCT/US2015/014208
§ 371 (c)(1),
(2) Date: Jun. 28, 2016

(87) PCT Pub. No.: WO2015/117116
PCT Pub. Date: Aug. 6, 2015

(65) Prior Publication Data
US 2016/0319641 A1    Nov. 3, 2016

Related U.S. Application Data

(60) Provisional application No. 61/934,943, filed on Feb. 3, 2014.

(51) Int. Cl.
*G06F 7/60*  (2006.01)
*G06F 17/10*  (2006.01)
(Continued)

(52) U.S. Cl.
CPC ........ *G01V 99/005* (2013.01); *E21B 41/0092* (2013.01); *E21B 43/26* (2013.01);
(Continued)

(58) Field of Classification Search
CPC ...... G06F 17/5018; E21B 49/08; E21B 43/26; E21B 41/0092; E21B 47/00; E21B 49/00; E21B 43/267
(Continued)

(56) References Cited

U.S. PATENT DOCUMENTS 6,356,860 B1   3/2002  Barnette
7,043,413 B2   5/2006  Ward et al.
(Continued)

FOREIGN PATENT DOCUMENTS

WO    2013016733 A1    1/2013

OTHER PUBLICATIONS

Bank et al., "Mesh Smoothing Using a Posteriori Error Estimates," Society for Industrial and Applied Mathematics, Journal on Numerical Analysis, vol. 34, No. 3, Jun. 1997, 19 pages.
(Continued)

*Primary Examiner* — Saif Alhija
(74) *Attorney, Agent, or Firm* — John W. Wustenberg; Parker Justiss, P.C.

(57) ABSTRACT

In some aspects, a flow model represents a flow path for well system fluid in a subterranean region. A first system of equations from a finite element (FE) discretization of a flow model is accessed by a computer system. A second system of equations that imposes a constraint on errors between an exact solution and an FE solution to the flow model is accessed by the computer system. The FE solution includes nodes representing locations along the flow path for well system fluid in the subterranean region. Locations of the nodes can be computed by operations of the computer system in an iterative manner by computing locations of new nodes based on locations of existing nodes and refining the locations of the new nodes and the locations of the existing nodes based on the first and second systems of equations.

20 Claims, 13 Drawing Sheets

(51) Int. Cl.
*G01V 99/00* (2009.01)
*E21B 43/26* (2006.01)
*E21B 41/00* (2006.01)
*E21B 47/00* (2012.01)
*E21B 49/00* (2006.01)
*E21B 49/08* (2006.01)
*G06F 17/50* (2006.01)
*G06F 17/11* (2006.01)
*G06F 9/455* (2006.01)
*E21B 43/267* (2006.01)
*E21B 47/06* (2012.01)

(52) U.S. Cl.
CPC ............. *E21B 47/00* (2013.01); *E21B 49/00* (2013.01); *E21B 49/08* (2013.01); *G06F 17/11* (2013.01); *G06F 17/5009* (2013.01); *G06F 17/5018* (2013.01); *E21B 43/267* (2013.01); *E21B 47/06* (2013.01); *E21B 47/065* (2013.01); *G01V 99/00* (2013.01); *G06F 9/455* (2013.01); *G06F 2217/16* (2013.01)

(58) Field of Classification Search
USPC ............................................................ 703/2
See application file for complete search history.

(56) References Cited

U.S. PATENT DOCUMENTS

| | | | |
|---|---|---|---|
| 7,181,380 | B2 | 2/2007 | Dusterhoft et al. |
| 8,204,727 | B2 * | 6/2012 | Dean ...................... E21B 43/26 703/10 |
| 8,898,044 | B2 | 11/2014 | Craig |
| 2010/0076738 | A1 | 3/2010 | Dean et al. |
| 2010/0204972 | A1 | 8/2010 | Hsu et al. |
| 2011/0120718 | A1 | 5/2011 | Craig |
| 2011/0125476 | A1 | 5/2011 | Craig |
| 2011/0257944 | A1 | 10/2011 | Du et al. |
| 2012/0203516 | A1 | 8/2012 | Hamann et al. |
| 2012/0310613 | A1 | 12/2012 | Moos et al. |
| 2013/0090902 | A1 | 4/2013 | Yao et al. |
| 2013/0204588 | A1 | 8/2013 | Copeland |
| 2013/0332129 | A1 | 12/2013 | Xia et al. |
| 2013/0346042 | A1 | 12/2013 | Shen et al. |
| 2014/0066395 | A1 | 3/2014 | Cho et al. |
| 2014/0066419 | A1 | 3/2014 | Chen et al. |
| 2014/0222392 | A1 | 8/2014 | Johnson et al. |
| 2014/0222393 | A1 | 8/2014 | Bai et al. |
| 2014/0262232 | A1 | 9/2014 | Dusterhoft et al. |
| 2014/0278316 | A1 | 9/2014 | Dusterhoft et al. |
| 2015/0051878 | A1 | 2/2015 | Kulkarni et al. |
| 2015/0066455 | A1 | 3/2015 | Madasu et al. |
| 2015/0066462 | A1 | 3/2015 | Shetty et al. |
| 2015/0186563 | A1 | 7/2015 | Johnson et al. |
| 2016/0341850 | A1 | 11/2016 | Lin et al. |

OTHER PUBLICATIONS

Bank, "PLTMG: A Software Package for Solving Elliptic Partial Differential Equations Users' Guide 9.0," Department of Mathematics, University of California at San Diego, Mar. 2004, 140 pages.

Diaz et al., "A Method of Grid Optimization for Finite Element Methods," Computer Methods in Applied Mechanics and Engineering 41 (1983), pp. 29-45.

PCT International Search Report and Written Opinion of the International Searching Authority, PCT/US2015/014208, Apr. 30, 2015, 12 pages.

Fu, Pengcheng, et al., "Fully Coupled Geomechanics and Discrete Flow Network Modeling of Hydraulic Fracturing for Geothermal Applications," Proceedings, Thirty-Sixth Workshop on Geothermal Reservoir Engineering, Jan. 31-Feb. 2, 2011, 19 pages.

Ben, Y., et al., "Simulating Hydraulic Fracturing with Discontinuous Deformation Analysis," 46th US Rock Mechanics/Geomechanics Symposium, Jun. 24-27, 2012, 8 pages.

Copeland, D.M., et al., "A Unified Leakoff and Flowback Model for Fractured Reservoirs," Unconventional Resources Technology Conference, Aug. 25-27, 2014, 10 pages.

* cited by examiner

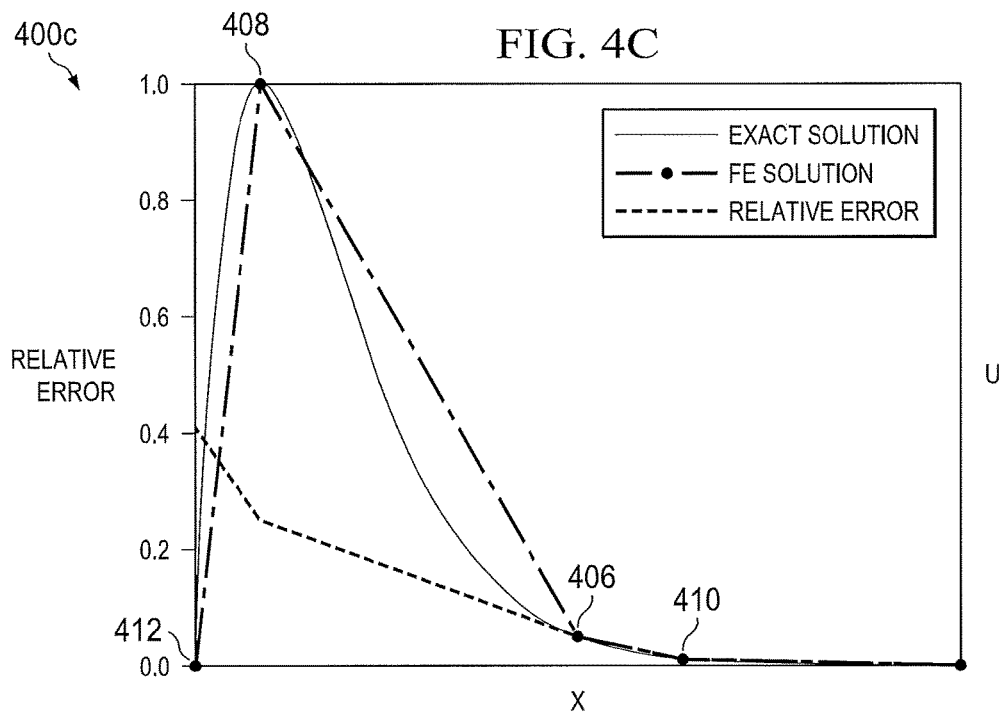
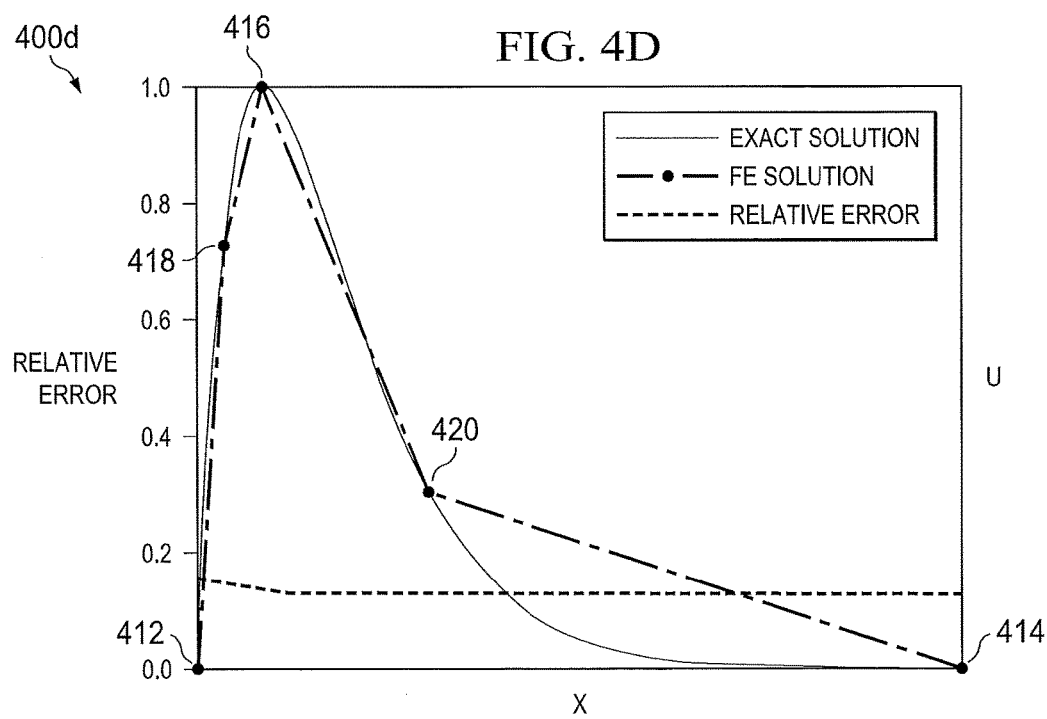

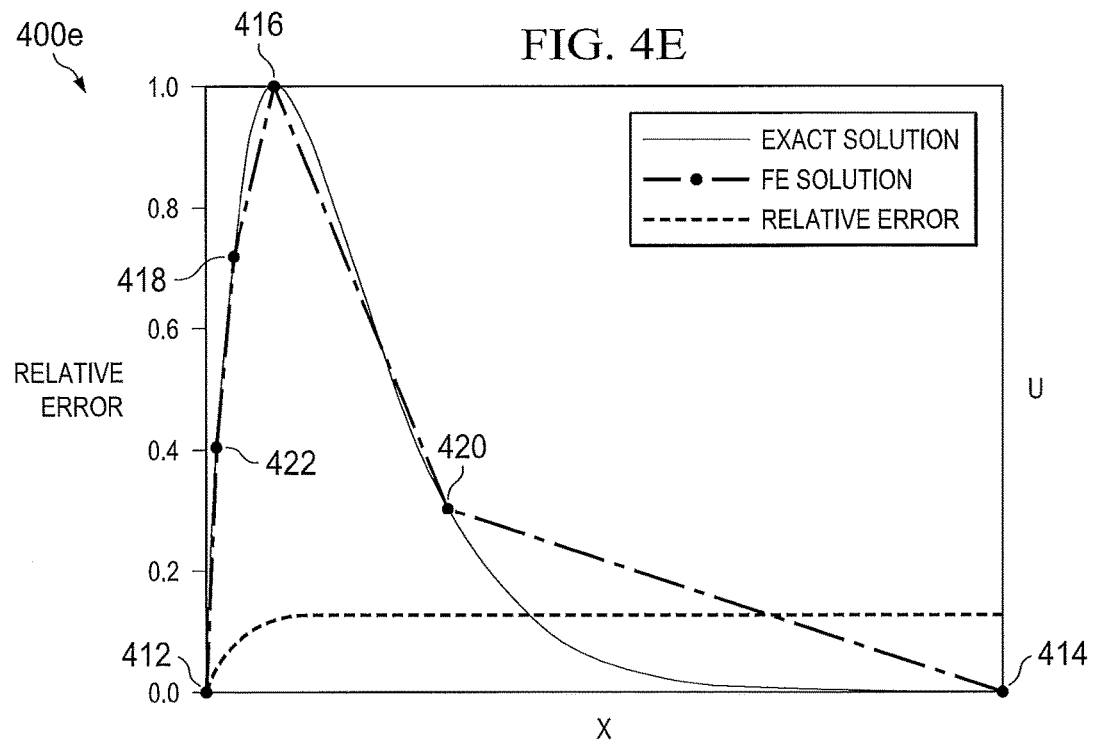
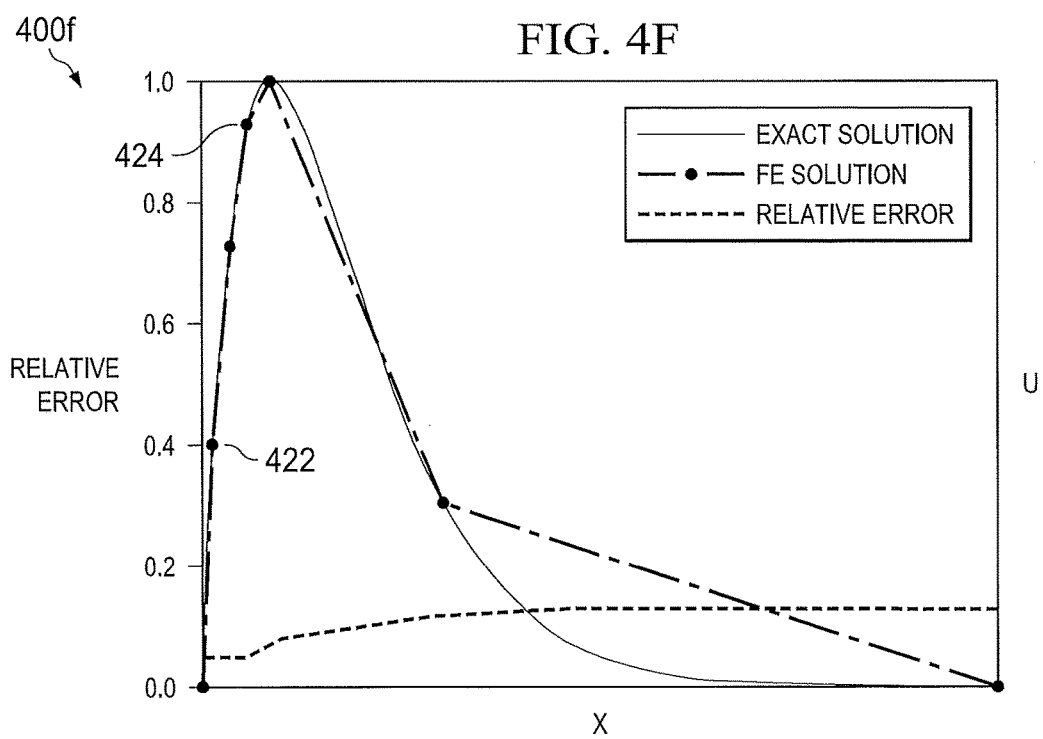

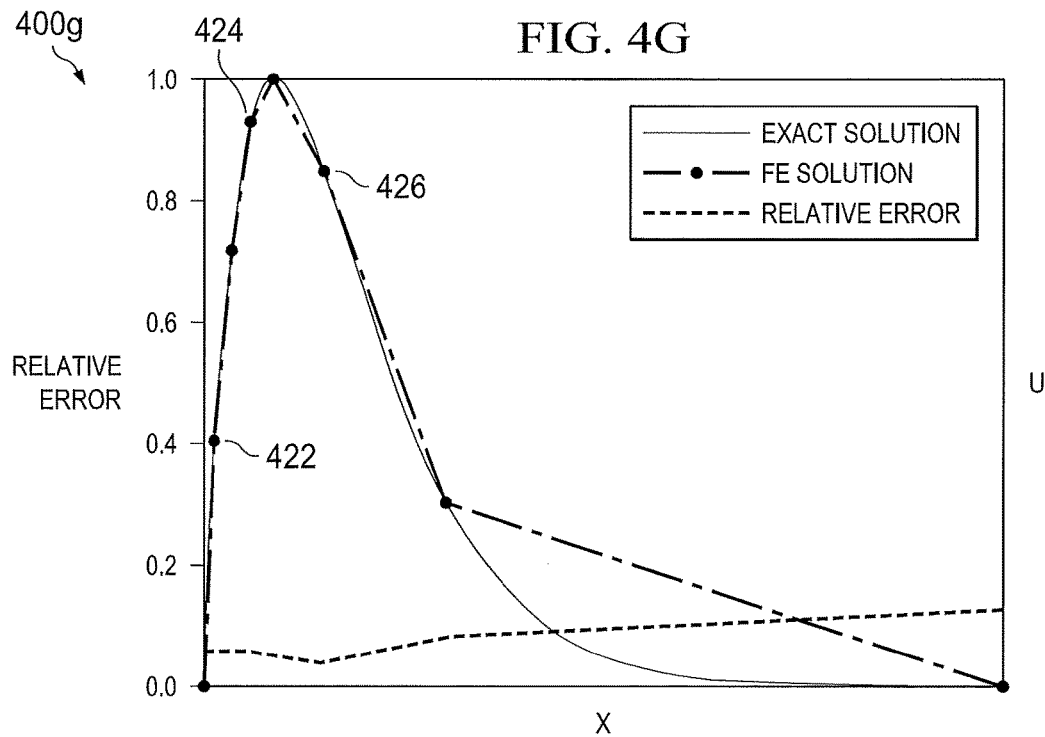
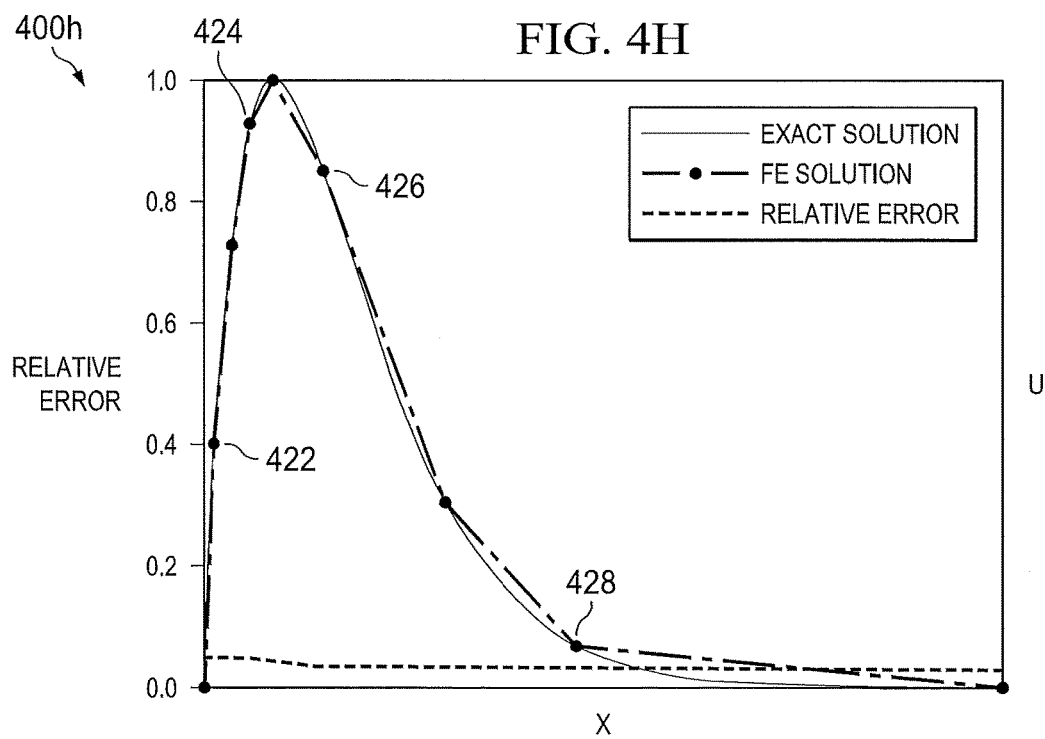

OPTIMIZING A GRID FOR FINITE ELEMENT SOLUTIONS FOR SUBTERRANEAN REGION SIMULATIONS

CROSS-REFERENCE TO RELATED APPLICATIONS

This application is a U.S. National Phase Application under 35 U.S.C. §371 and claims the benefit of priority to International Application Serial No. PCT/US2015/014208, filed on Feb. 3, 2015, which claims the benefit of priority to U.S. Provisional Application Ser. No. 61/934,943, filed on Feb. 3, 2014, the contents of which are hereby incorporated by reference.

BACKGROUND

The following description relates to optimizing a grid for finite element solutions for simulating fluid flow, solid mechanics, fluid-solid interactions, or other properties of a subterranean region.

Flow models have been used to simulate fluid flow in wellbores and other environments. A flow model can use a numerical technique such as a finite element method for the simulation. A finite element method can include a distribution of elements over the simulation domain.

DESCRIPTION OF DRAWINGS

FIGS. 4A-K are plots showing aspects of an example stair-step grid optimizing algorithm for a one-dimensional (1D) finite element solution.

Like reference symbols in the various drawings indicate like elements.

DETAILED DESCRIPTION

Figure 1:
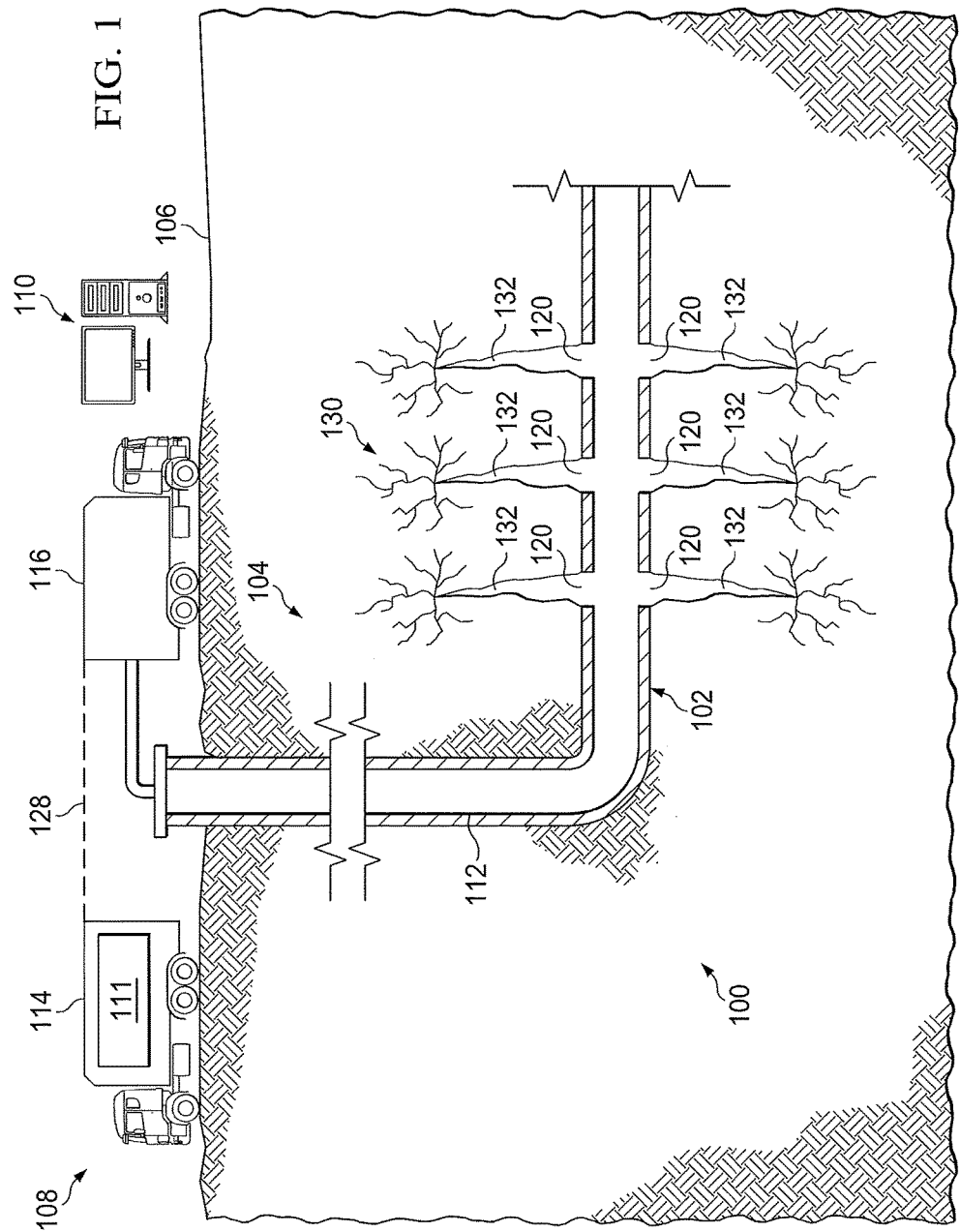
FIG. 1 is a schematic diagram of an example well system.

Fluid flow models can be used to analyze fluid flow, for example, in a well system environment (e.g., in a wellbore, a fracture network, within the reservoir rock matrix, in a well system tool, etc.) or other environments. In some cases, a fluid flow model models the flow of fluid in a fracture, a wellbore, a reservoir, for example, during a hydraulic fracturing treatment or another type of injection treatment. The unconventional reservoir stimulation technology for extracting oil and gas can rely on fracturing of the rocks, which increases the reservoir's potential for flow-back and production. Hydraulic fracturing is one of several technologies for properly fracturing the rock, where the crack and/or fault-initiation and their proper propagation can be achieved by pumping fluids at high flow rates and relatively high pressure. This process intends to improve the effective permeability of the rock, thus leading to enhanced oil and gas production. Sometimes, these fluids are laden with solid particles known as proppant to keep the fracture open, especially during the flow-back phase following the stimulation phase. These fractures can range in size from a few meters to hundreds of meters, while their number can extend to thousands of fractures in one play. Moreover, the induced and the newly created fractures can interact with the natural fractures, leading to the formation of a very complex fracture network structure and a quite general network graph, which may change its configuration dynamically in time. These physical characteristics of the fracture network make its computational simulation very complicated, with high computational cost in terms of both computational time and memory usage.

Modeling the hydraulic fracturing treatment can help to efficiently design, analyze, or optimize the treatment. In some cases, a hydraulic fracturing model combines simulations of fracture propagation, rock deformation, fluid flow, proppant transport, and other phenomena. The fluid flow models used in these and other types of simulations can account for the complex physical environments and conditions. For example, some subterranean formations include low-permeability, naturally-fractured rock media, and the flow models can model a discrete and/or complex fracture network where the induced and new fractures interact with natural fractures. Other types of environments and conditions can be modeled. For example, computational geometry for a hydraulic fracturing process can include components, such as, for example, wellbore, fractures, rock blocks, reservoirs, and junctions. Among the example components, the rock blocks and the reservoirs physically overlap; however, they may represent two distinct physical processes. The rock blocks undergo deformation under flow pressure, while the reservoirs exhibit mass transfer processes such as fluid mass accumulation and drainage, termed leak-off/flow-back. In some instances, the overall computation geometry of a hydraulic fracturing process mainly encompasses these two components. In some instances, it can be difficult to obtain highly accurate solutions at minimal computation cost, thus leading to the necessity of optimal meshing.

In some environments, the fluid flow is unsteady and multi-dimensional (e.g., three-dimensional or at least two-dimensional (2D)). For example, in some types of fractures, the dominant flow (2D or three-dimensional (3D)) exhibits transient behaviors. In some instances, two- or three-dimensional flow can be modeled by a one-dimensional (1D) flow model, for example, by properly integrating the governing flow equations over the cross-section of the two- or three-dimensional flow path. In some cases, the governing equations of a flow model can include linear or nonlinear partial differential equations (PDE) that can be solved using, for example, finite element (FE), finite volume, spectral methods or finite difference methods.

In some implementations, flow models can be solved using finite element method (FEM). In a typical finite element approach, the domain is subdivided into several smaller domains (elements), and the solution is approximated in each element by a prescribed family of functions, whose dimensions are the same as the dimensions of the subdomains, for example, simple multivariable polynomials. The contribution to the governing equations of each element is integrated into a global system of equations which are then solved to obtain the global numerical solution for the equations over the given geometric domain. In some instances, the computational geometry domain can be discretely represented by a sequence of connected points called "nodes" or "grid points" or "a mesh." These nodes can represent point locations in one, two, or three dimensions. These nodes can be uniformly or non-uniformly distributed in the computational domain. Some numerical schemes for solving the PDE can be optimized or otherwise improved by purposefully distributing the nodes in the relevant domain.

As the numerical or FE solution is an approximation of the true or exact solution, it is important to control the error of the approximate solution so that the results obtained from FEM can be trusted. However, it is also important in many applications to obtain results in a reasonable amount of computational time, and thus it is necessary to try and keep the total problem size as small as possible. For these cases, it may not be feasible to simply increase the number of elements until the error is below an acceptable level. The example techniques described in this disclosure can help optimize, refine, or otherwise improve the locations of nodes in a grid for FE solutions such that the error of the FE solution is minimal or otherwise reduced while keeping the total number of elements to a reasonable number (i.e., an upper bound on the total number of elements used). In many applications, the example techniques can allow for significant error reduction and efficient implementation by obtaining results in a reasonable time frame.

In some implementations, the example techniques include solving a numerical system arising from a finite element (FE) discretization of an original system (e.g., the governing equations of a flow model). The numerical system is coupled with an error control system that imposes a condition on the error between the approximate solution obtained from FEM and the exact solution of the original system. For example, the error control system can impose a pre-defined condition, for example, that the errors are equally distributed across all elements, or, for example, that the error is upper bounded over the all elements. Additional or different error distribution functions can be used for the error control system. In some instances, the numerical system and the error control system are solved simultaneously using an iterative methodology, for example, Newton-Raphson iteration scheme, in order to accelerate convergence towards the optimal grid and solution. In some other instances, instead of solving the full system directly, the full solution can be approached by optimizing successively refined grids until the full order solution is obtained. For example, the grid optimizing algorithm can be a stair-step algorithm including multiple levels of grid refinements. This allows for the solution to be reached quickly and in a more stable manner by solving several smaller problems as opposed to the full large problem, and thus the final grid can result in a better approximation of the true solution for a given error control, for example, keeping the error to a minimum. In some implementations, optimizing the location of the grid points allows for much more efficient and flexible error control when compared to the usual method of simple grid refinement.

The example techniques for optimizing grid for FE solutions can applied to 1D flow models and can be extended to 2D and 3D flow models as well. The example techniques can provide efficient algorithms to attain high accuracy results for a given number of nodes of the finite element formulation, for example, by an adaptive algorithm which calculates the optimal nodal distribution that minimizes the overall error of the numerical simulation. The example techniques are robust and general, and thus can be applied to many areas of commercial interest that require well-controlled accuracy and efficient numerical calculations. For example, the example techniques can be applied to hydraulic fracturing simulations in order to keep the size of the problem down (and thus increase the computational speed) while maintaining a high level of accuracy. For instance, the example techniques can reduce the overall cost of hydraulic fracture simulation by minimizing the size of the finite element mesh typically associated with the rock blocks' reservoir and solid mechanics aspects, providing real-time simulation capability while maintaining the required level of accuracy. The increased efficiency and accuracy will allow reservoir and solid mechanics simulation software to gain further traction as a tool for predicting and enhancing oil and gas production. The example techniques can be used to minimize the approximation error of linear or nonlinear 1D and 2D finite element models with a fixed number of grid points. The example techniques may have additional or different advantages in some applications.

FIG. 1 is a diagram of an example well system 100 and a computing subsystem 110. The example well system 100 includes a wellbore 102 in a subterranean region 104 beneath the ground surface 106. The example wellbore 102 shown in FIG. 1 includes a horizontal wellbore. However, a well system may include any combination of horizontal, vertical, slant, curved, or other wellbore orientations. The well system 100 can include one or more additional treatment wells, observation wells, or other types of wells.

The computing subsystem 110 can include one or more computing devices or systems located at the wellbore 102 or other locations. The computing subsystem 110 or any of its components can be located apart from the other components shown in FIG. 1. For example, the computing subsystem 110 can be located at a data processing center, a computing facility, or another suitable location. The well system 100 can include additional or different features, and the features of the well system can be arranged as shown in FIG. 1 or in another configuration.

The example subterranean region 104 may include a reservoir that contains hydrocarbon resources, such as oil, natural gas, or others. For example, the subterranean region 104 may include all or part of a rock formation (e.g., shale, coal, sandstone, granite, or others) that contain natural gas. The subterranean region 104 may include naturally fractured rock or natural rock formations that are not fractured to any significant degree. The subterranean region 104 may include tight gas formations that include low permeability rock (e.g., shale, coal, or others).

The example well system 100 shown in FIG. 1 includes an injection system 108. The injection system 108 can be used to perform an injection treatment, whereby fluid is injected into the subterranean region 104 through the wellbore 102. In some instances, the injection treatment fractures part of a rock formation or other materials in the subterranean region 104. In such examples, fracturing the rock may increase the surface area of the formation, which may increase the rate at which the formation conducts fluid resources to the wellbore 102.

The example injection system 108 can inject treatment fluid into the subterranean region 104 from the wellbore 102. For example, a fracture treatment can be applied at a single fluid injection location or at multiple fluid injection locations in a subterranean zone, and the fluid may be injected over a single time period or over multiple different time periods. In some instances, a fracture treatment can use multiple different fluid injection locations in a single wellbore, multiple fluid injection locations in multiple different wellbores, or any suitable combination. Moreover, the fracture treatment can inject fluid through any suitable type of wellbore, such as, for example, vertical wellbores, slant wellbores, horizontal wellbores, curved wellbores, or combinations of these and others.

The example injection system 108 includes instrument trucks 114, pump trucks 116, and an injection treatment control subsystem 111. The injection system 108 may apply injection treatments that include, for example, a multi-stage fracturing treatment, a single-stage fracture treatment, a mini-fracture test treatment, a follow-on fracture treatment, a re-fracture treatment, a final fracture treatment, other types of fracture treatments, or a combination of these. The injection system 108 may inject fluid into the formation above, at or below a fracture initiation pressure for the formation; above, at, or below a fracture closure pressure for the formation; or at another fluid pressure.

The pump trucks 116 can include mobile vehicles, immobile installations, skids, hoses, tubes, fluid tanks, fluid reservoirs, pumps, valves, mixers, or other types of structures and equipment. The example pump trucks 116 shown in FIG. 1 can supply treatment fluid or other materials for the injection treatment. The example pump trucks 116 can communicate treatment fluids into the wellbore 102 at or near the level of the ground surface 106. The treatment fluids can be communicated through the wellbore 102 from the ground surface 106 level by a conduit installed in the wellbore 102. The conduit 112 may include casing cemented to the wall of the wellbore 102. In some implementations, all or a portion of the wellbore 102 may be left open, without casing. The conduit 112 may include a working string, coiled tubing, sectioned pipe, or other types of conduit.

The instrument trucks 114 can include mobile vehicles, immobile installations, or other structures. The example instrument trucks 114 shown in FIG. 1 include an injection treatment control subsystem 111 that controls or monitors the injection treatment applied by the injection system 108. The communication links 128 may allow the instrument trucks 114 to communicate with the pump trucks 116, or other equipment at the ground surface 106. Additional communication links may allow the instrument trucks 114 to communicate with sensors or data collection apparatus in the well system 100, remote systems, other well systems, equipment installed in the wellbore 102 or other devices and equipment. In some implementations, communication links allow the instrument trucks 114 to communicate with the computing subsystem 110, which may run simulations and provide simulation data. The well system 100 can include multiple uncoupled communication links or a network of coupled communication links. The communication links can include wired or wireless communications systems, or combinations.

The injection system 108 may also include surface and down-hole sensors to measure pressure, rate, temperature or other parameters of treatment or production. For example, the injection system 108 may include pressure meters or other equipment that measure the pressure of fluids in the wellbore 102 at or near the ground surface 106 level or at other locations. The injection system 108 may include pump controls or other types of controls for starting, stopping, increasing, decreasing or otherwise controlling pumping as well as controls for selecting or otherwise controlling fluids pumped during the injection treatment. The injection treatment control subsystem 111 may communicate with such equipment to monitor and control the injection treatment.

The example injection treatment control subsystem 111 shown in FIG. 1 controls operation of the injection system 108. The injection treatment control subsystem 111 may include data processing equipment, communication equipment, or other systems that control injection treatments applied to the subterranean region 104 through the wellbore 102. The injection treatment control subsystem 111 may be communicably linked to the computing subsystem 110, which may calculate, select, or optimize fracture treatment parameters for initialization, propagation, or opening fractures in the subterranean region 104. The injection treatment control subsystem 111 may receive, generate, or modify an injection treatment plan (e.g., a pumping schedule) that specifies properties of an injection treatment to be applied to the subterranean region 104.

In the example shown in FIG. 1, an injection treatment has fractured the subterranean region 104. FIG. 1 shows examples of dominant fractures 132 formed by fluid injection through perforations 120 along the wellbore 102. Generally, the fractures can include fractures of any type, number, length, shape, geometry, or aperture. Fractures can extend in any direction or orientation, and they may be formed at multiple stages or intervals, at different times or simultaneously. The example dominant fractures 132 shown in FIG. 1 extend through natural fracture networks 130. Generally, fractures may extend through naturally fractured rock, regions of un-fractured rock, or both. The injected fracturing fluid can flow from the dominant fractures 132 into the rock matrix, into the natural fracture networks 130, or in other locations in the subterranean region 104. The injected fracturing fluid can, in some instances, dilate or propagate the natural fractures or other pre-existing fractures in the rock formation.

In some implementations, the computing subsystem 110 can simulate fluid flow in the well system 100. For example, the computing subsystem 110 can include flow models for simulating fluid flow in or between various locations of fluid flow in the well system, such as, for example, the wellbore 102, the perforations 120, the conduit 112 or components thereof, the dominant fractures 132, the natural fracture networks 130, the rock media in the subterranean region 104, or a combination of these and others. The flow models can model the flow of incompressible fluids (e.g., liquids), compressible fluids (e.g., gases), or a combination multiple fluid phases. The flow models can model the flow of fluid in an intersection of flow paths. In some instances, the flow models can model flow in one, two, or three spatial dimensions. The flow models can include nonlinear systems of differential or partial differential equations. The computing subsystem 110 can generate nodes or a mesh for use in the flow models or simulations. The computing subsystem 110 can use the flow models to predict, describe, or otherwise analyze the dynamic behavior of fluid in the well system 100.

The computing subsystem 110 can perform simulations before, during, or after the injection treatment. In some implementations, the injection treatment control subsystem 111 controls the injection treatment based on simulations performed by the computing subsystem 110. For example, a pumping schedule or other aspects of a fracture treatment plan can be generated in advance based on simulations performed by the computing subsystem 110. As another example, the injection treatment control subsystem 111 can modify, update, or generate a fracture treatment plan based on simulations performed by the computing subsystem 110 in real time during the injection system.

In some cases, the simulations are based on data obtained from the well system 100. For example, pressure meters, flow monitors, microseismic equipment, electro-magnetic measurements, tiltmeters, or other equipment can perform measurements before, during, or after an injection treatment; and the computing subsystem 110 can simulate fluid flow based on the measured data. In some cases, the injection treatment control subsystem 111 can select or modify (e.g., increase or decrease) fluid pressures, fluid densities, fluid compositions, and other control parameters based on data provided by the simulations. In some instances, data provided by the simulations can be displayed in real time during the injection treatment, for example, to an engineer or other operator of the well system 100.

Some of the techniques and operations described herein may be implemented by one or more computing systems configured to provide the functionality described. In various instances, a computing system may include any of various types of devices, including, but not limited to, personal computer systems, desktop computers, laptops, notebooks, mainframe computer systems, handheld computers, workstations, tablets, application servers, computer clusters, distributed computing systems, storage devices, or any type of computing or electronic device.

Figure 2:
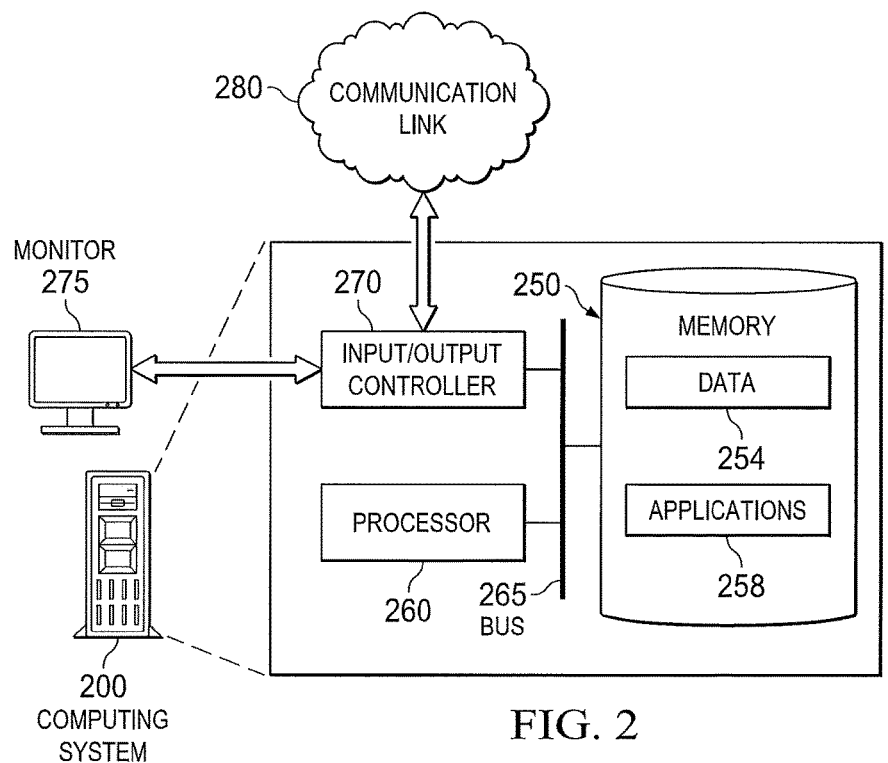
FIG. 2 is a schematic diagram of an example computing system.

FIG. 2 is a diagram of an example computing system 200. The example computing system 200 can operate as the example computing subsystem 110 shown in FIG. 1, or it may operate in another manner. For example, the computing system 200 can be located at or near one or more wells of a well system or at a remote location apart from a well system. All or part of the computing system 200 may operate independent of a well system or well system components. The example computing system 200 includes a memory 250, a processor 260, and input/output controllers 270 communicably coupled by a bus 265. The memory 250 can include, for example, a random access memory (RAM), a storage device (e.g., a writable read-only memory (ROM) or others), a hard disk, or another type of storage medium. The computing system 200 can be preprogrammed or it can be programmed (and reprogrammed) by loading a program from another source (e.g., from a CD-ROM, from another computer device through a data network, or in another manner). In some examples, the input/output controller 270 is coupled to input/output devices (e.g., a monitor 275, a mouse, a keyboard, or other input/output devices) and to a communication link 280. The input/output devices can receive or transmit data in analog or digital form over communication links such as a serial link, a wireless link (e.g., infrared, radio frequency, or others), a parallel link, or another type of link.

The communication link 280 can include any type of communication channel, connector, data communication network, or other link. For example, the communication link 280 can include a wireless or a wired network, a Local Area Network (LAN), a Wide Area Network (WAN), a private network, a public network (such as the Internet), a WiFi network, a network that includes a satellite link, or another type of data communication network.

The memory 250 can store instructions (e.g., computer code) associated with an operating system, computer applications, and other resources. The memory 250 can also store application data and data objects that can be interpreted by one or more applications or virtual machines running on the computing system 200. As shown in FIG. 2, the example memory 250 includes data 254 and applications 258. The data 254 can include treatment data, geological data, fracture data, fluid data, or any other appropriate data. The applications 258 can include flow models, fracture treatment simulation software, reservoir simulation software, or other types of applications. In some implementations, a memory of a computing device includes additional or different data, application, models, or other information.

In some instances, the data 254 include treatment data relating to fracture treatment plans. For example, the treatment data can indicate a pumping schedule, parameters of a previous injection treatment, parameters of a future injection treatment, or parameters of a proposed injection treatment. Such parameters may include information on flow rates, flow volumes, slurry concentrations, fluid compositions, injection locations, injection times, or other parameters.

In some instances, the data 254 include geological data relating to geological properties of a subterranean region. For example, the geological data may include information on wellbores, completions, or information on other attributes of the subterranean region. In some cases, the geological data includes information on the lithology, fluid content, stress profile (e.g., stress anisotropy, maximum and minimum horizontal stresses), pressure profile, spatial extent, or other attributes of one or more rock formations in the subterranean zone. The geological data can include information collected from well logs, rock samples, outcroppings, microseismic imaging, or other data sources.

In some instances, the data 254 include fracture data relating to fractures in the subterranean region. The fracture data may identify the locations, sizes, shapes, and other properties of fractures in a model of a subterranean zone. The fracture data can include information on natural fractures, hydraulically induced fractures, or any other type of discontinuity in the subterranean region. The fracture data can include fracture planes calculated from microseismic data or other information. For each fracture plane, the fracture data can include information (e.g., strike angle, dip angle, etc.) identifying an orientation of the fracture, information identifying a shape (e.g., curvature, aperture, etc.) of the fracture, information identifying boundaries of the fracture, or any other suitable information.

In some instances, the data 254 include fluid data relating to well system fluids. The fluid data may identify types of fluids, fluid properties, thermodynamic conditions, and other information related to well system fluids. The fluid data can include flow models for compressible or incompressible fluid flow. For example, the fluid data can include systems of governing equations (e.g., Navier-Stokes equation, continuity equation, etc.) that represent fluid flow generally or fluid flow under certain types of conditions. In some cases, the governing flow equations define a nonlinear system of equations. The fluid data can include data related to native fluids that naturally reside in a subterranean region, treatment fluids to be injected into the subterranean region, hydraulic fluids that operate well system tools, or other fluids that may or may not be related to a well system.

The applications 258 can include software applications, scripts, programs, functions, executables, or other modules that are interpreted or executed by the processor 260. For example, the applications 258 can include a fluid flow simulation module, a hydraulic fracture simulation module, a reservoir simulation module, or another other type of simulator. The applications 258 may include machine-readable instructions for performing one or more of the operations related to FIGS. 3-11. For example, the applications 258 can include modules or algorithms for generating a distribution of grid points. The applications 258 may include machine-readable instructions for generating a user interface or a plot, for example, illustrating fluid flow or fluid properties. The applications 258 can receive input data, such as treatment data, geological data, fracture data, fluid data, or other types of input data, from the memory 250, from another local source, or from one or more remote sources (e.g., via the communication link 280). The applications 258 can generate output data and store the output data in the memory 250, in another local medium, or in one or more remote devices (e.g., by sending the output data via the communication link 280).

The processor 260 can execute instructions, for example, to generate output data based on data inputs. For example, the processor 260 can run the applications 258 by executing or interpreting the software, scripts, programs, functions, executables, or other modules contained in the applications 258. The processor 260 may perform one or more of the operations related to FIGS. 3-11. The input data received by the processor 260 or the output data generated by the processor 260 can include any of the treatment data, the geological data, the fracture data, or any other data.

Figure 3:
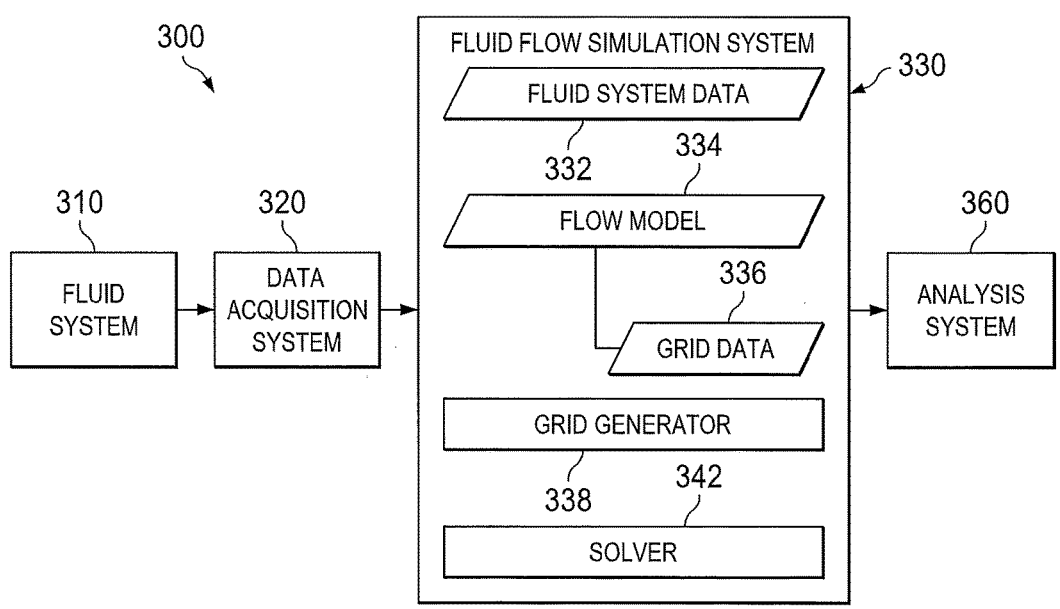
FIG. 3 is a diagram of an example system architecture.

FIG. 3 is a diagram of an example system architecture 300. The example system architecture 300 can be used to model physical phenomena related to a well system environment. For example, the architecture 300 can be used to model fluid flow in an injection treatment of the subterranean region 104 shown in FIG. 1. In some instances, the architecture 300 is used to model fluid flow and other aspects of an injection treatment or other activities in a well system. In some cases, the architecture 300 is used to model fluid flow within or between one or more wellbores, wellbore conduits, wellbore tools, wellbore perforations, reservoir rock media, reservoir fractures (e.g., fractures in a complex fracture network, in a dominant multi-wing fracture extending from a wellbore, in a natural fracture network, in hydraulically induced fractures, etc.), or combinations of these and other types of flow paths in a well system environment.

The example architecture 300 shown in FIG. 3 includes a fluid system 310, a data acquisition system 320, a fluid flow simulation system 330, and an analysis system 360. The architecture 300 can include additional or different components or subsystems, and the example components shown in FIG. 3 can be combined, integrated, divided, or configured in another manner. For example, the fluid flow simulation system 330 and the analysis system 360 can be subcomponents of an integrated computing system (e.g., the computing system 200 shown in FIG. 2) or multiple computing systems, or the data acquisition system 320 can be integrated with the fluid system 310. As another example, the fluid flow simulation system 330 or the analysis system 360, or both, can be implemented in a computing system that operates independent of the fluid system 310 or the data acquisition system 320.

The example fluid system 310 can include any physical system where fluid flow or other fluid phenomena occur. The fluid system 310 can represent a well system environment (e.g., the well system 100 shown in FIG. 1) or a subset of well system components or subsystems (e.g., the injection system 108 shown in FIG. 1). The fluid system 310 can include the physical reservoir rock in a subterranean reservoir (e.g., the subterranean region 104 shown in FIG. 1), fractures or a fracture network in the reservoir rock, one or more downhole systems installed in a wellbore, or a combination of them.

The data acquisition system 320 can include systems or hardware that obtain data from the fluid system 310. For example, the data acquisition system 320 can include flow sensors, pressure sensors, temperature sensors, and other types of measurement devices. The data acquisition system 320 can include communication and data storage systems that store, transfer, manipulate, or otherwise manage the information obtained from the fluid system 310.

The fluid flow simulation system 330 can include one or more computer systems or computer-implemented programs that simulate fluid flow. The fluid flow simulation system 330 can receive information related to the fluid system 310 and simulate fluid flow and other fluid phenomena that occur in the fluid system 310. For example, the fluid flow simulation system 330 can calculate flow velocities or other aspects of fluid flow based on data from the data acquisition system 320 or another source.

The example fluid flow simulation system 330 includes fluid system data 332, flow models 334, and a solver 342. The fluid flow simulation system 330 can include additional or different features, and the features of a fluid flow simulation system 330 can be configured to operate in another manner. The modules of the fluid flow simulation system 330 can include hardware modules, software modules, or other types of modules. In some cases, the modules can be integrated with each other or with other system components. In some example implementations, the fluid flow simulation system 330 can be implemented as software running on a computing system, and the modules of the fluid flow simulation system 330 can be implemented as software functions or routines that are executed by the computing system.

The fluid system data 332 can include any information related to the fluid system 310 or another fluid system. For example, the fluid system data 332 can indicate physical properties (e.g., geometry, cross-sectional areas, surface properties, reservoir properties, etc.) of one or more flow paths in the fluid system 310, material and physics properties (e.g., density, viscosity, Reynolds number, etc.) of one or more fluids in the fluid system 310, thermodynamic data (e.g., fluid pressures, fluid temperatures, fluid flow rates, etc.) measured at one or more locations in the fluid system 310, and other types of information. The fluid system data 332 can include information received from the data acquisition system 320 and other sources.

The flow models 334 can include any information or modules that can be used to simulate fluid flow, solid mechanics, fluid-solid interactions, or other properties of a subterranean region. For example, the flow models 334 can be sued to simulate well system fluid in a subterranean region. The flow models 334 can include governing equations, spatial and temporal discretization data, grid points, or other information. In some examples, the flow models 334 include governing flow equations, such as, for example, the Navier-Stokes equation or related approximations of the Navier-Stokes equation, diffusion-convection equations, continuity equations, or other types of flow equations. As an example, the flow models 334 may include any equations below, or the flow models 334 may include additional or different governing flow equations.

The flow models 334 can include various types of subsystem models for simulating fluid flow in a subterranean region. In some instances, the flow models include multiple subsystem models, and each subsystem model can represent the fluid flow associated with a distinct sub-region in a subterranean region. For example, a flow model can include a wellbore subsystem model for modeling fluid flow in a wellbore (e.g., wellbore 102 in FIG. 1) or a wellbore tool, a fracture subsystem model for modeling fluid flow in fractures, a rock block subsystem model for modeling solid-fluid interactions, a reservoir subsystem model for modeling fluid flow in the reservoir media, a leak-off or flow-back model (can be regarded as an example reservoir subsystem model) for modeling fluid flow processes between reservoir rock and adjacent fractures, a proppant transport subsystem model for modeling proppant transport in the fluid flow, or a combination of these and other types of subsystem models. In some instances, the subsystem models can be connected, for example, by one or more junction models that can provide fluid continuity conditions (e.g., connection conditions, boundary conditions, etc.) among two or more of the subsystem models. The flow models 334 can include or otherwise interact with additional or different subsystems models.

The flow models 334 can include spatial discretization data, such as, for example, discrete nodes that represent locations of fluid flow along flow paths in the fluid system 310. Generally, the flow models 334 can represent any number of intersecting flow path branches, including any type of flow path intersection. In some cases, the flow path branches represent a fracture network in a subterranean region, and connectivity between the flow path branches can correspond to the fracture connectivity in the fracture network. In some cases, the flow paths represent flow conduits in a wellbore, perforations in a wellbore casing, hydraulic fractures extending from a wellbore, natural fractures connected to hydraulic fractures or a wellbore, or other types of interconnected flow paths in a well system environment.

The spatial discretization of the flow paths can be implemented by any suitable scheme. For example, the system can be discretized according to a finite element model, a finite volume model, finite difference model, or another technique. The system can be discretized in a manner that permits spatial derivatives or partial spatial derivatives and/or time derivatives to be properly approximated in the discretized spatial domain using numerical methods.

As shown in FIG. 3, the fluid flow simulation system 330 can also include grid data 336 and a grid generator 338. The grid generator 338 can include any information or modules that can be used to generate and optimize grid points (also referred to as "nodes") for a flow model. For example, the grid generator 338 can generate and optimize a distribution of grid points along a flow path based on the length of the flow path, an estimated grid point distribution, a desired number of grid points, or a combination of these and other factors.

The grid data 336 can be included as part of the flow model 334 or can be based on one or more of flow path parameters, the governing equations of flow model 334, the finite element (FE) discretization of the flow model 334, an error control system associated with the FE discretization of the flow model 334, and other information. All or part of the grid data 336 can be generated by the grid generator 338 or another type of module. The grid data 336 can include information of the grid for FE solutions of a one-dimensional, two-dimensional flow model, or higher-dimensional flow model or other systems of questions. The grid data 336 can indicate one or more of the number, a location, and a distribution of nodes in a grid. In some cases, the grid data 336 can indicate node locations that result in a truncation error of the simulated quantities within a designated threshold.

In some implementations, the fluid flow simulation system 330 can also include a time marching module to perform calculations in a discretized time domain. For example, the governing flow equations may include derivatives or partial derivatives in the time direction, and the time marching module can calculate such quantities based on a time marching algorithm. Example time marching schemes include the backward Euler scheme, the Crank-Nicolson scheme, and others.

The solver 342 can include any information or modules that can be used to solve a system of equations at a given time marching step. For example, the solver 342 can be a direct solver or another type of solver. In some implementations, the solver 342 receives inputs from the other components of the fluid flow simulation system 330. For example, the inputs can include the discretized governing flow equations, the grid data 336, the fluid system data 332, or any other information. The inputs can also include data generated or reported from a separate simulation or model. The solver 342 can generate a numerical solution for a variable of interest based on the inputs. The solution can be generated for some or all of the grid points in a discretized spatial domain. For example, the solver 342 may calculate values of fluid velocity, fluid pressure, or another variable over a spatial domain; the values can be calculated for an individual time step or multiple time steps.

The analysis system 360 can include any systems, components, or modules that analyze, process, use, or access the simulation data generated by the fluid flow simulation system 330. For example, the analysis system 360 can be a real-time analysis system that displays or otherwise presents fluid data (e.g., to a field engineer, etc.) during an injection treatment. In some cases, the analysis system 360 includes other simulators or a simulation manager that use the fluid simulation data to simulate other aspects of a well system. For example, the analysis system 360 can be a fracture simulation suite that simulates fracture propagation based on the simulated fluid flow data generated by the fluid flow simulation system 330. As another example, the analysis system 360 can be a reservoir simulation suite that simulates fluid migration in a reservoir based on the simulated fluid flow data generated by the fluid flow simulation system 330.

In some implementations, the example techniques can include augmenting the original FEM system for the nodal solution $u_j$, $$G_i^{FEM}(u_j, x_j) = 0 \qquad (1)$$

with an additional system for the location of the nodes $x_j$, $$G_i^{ERR}(u_j, x_j) = 0, \qquad (2).$$

where the subscript i refers to the $i^{th}$ equation of either the FEM system or error system. For example, Equation (1) can represent a finite element (FE) discretization of a governing equation of a flow model. u can represent an exact solution to the flow model and $u_j$ can represent the discrete node of the exact solution u. x can represent the FE or FEM solution that approximates the exact solution u; and $x_j$ can represent the discrete node of the FE solution x, corresponding to the discrete node $u_j$ of the exact solution u. In some implementations, $x_j$ and $x_{j+1}$ can represent the endpoints of a finite element j. Equation (2) can be an error control system for minimizing the error associated with the FEM or for another purpose. For instance, Equation (2) can impose a constraint on the error level between the FE solution $x_j$ and the exact solution $u_j$. For example, Equation (2) can subject the error to a specific distribution, such as a uniform distribution or another distribution. To describe the example techniques in a concrete manner, the following discussion considers a specific example of FE discretization of a 1D Poisson equation. The example techniques can be used in additional or different applications.

For example, the FE discretization of the 1D Poisson equation ($-u_{xx}=f(x)$) using linear Lagrange interpolants can be represented by Equation (3):

$$K_{21}^{i-1}u_{i-1}+(K_{22}^{i-1}+K_{11}^{i})u_i+K_{12}^{i}u_{i+1}-F_2^{i-1}-F_1^{i}=0 \quad (3).$$

Equation (3) can be coupled with the error control system $$(x_i-x_{i-1})^2(\|f(x)\|_{L^2}^{i-1})^2-(x_{i+1}-x_i)^2(\|f(x)\|_{L^2}^{i})^2=0 \quad (4)$$

for $i=2, 3, \ldots, N$, where $N$ is the total number of nodes used. Here, the various K and F coefficients in Equation (3) can correspond to elemental stiffness matrix and load vector contributions for the $i^{th}$ FEM approximation to the governing equation, for example, the Poisson equation, and can depend on the nodes $x_{i-1}$, $x_i$, and $x_{i+1}$ as well as other geometrical or physical properties. The example error control system in Equation (4) can be based on equally distributing the $L^2$ norm of the governing equation residual across all elements, which results from theory of minimizing the total error of the approximation for linear FEM discretization of elliptic equations. In some implementations, the errors across the elements can vary, and thus Equation (4) can be include another error distribution function, such as, for example, $$(x_i-x_{i-1})^2(\|f(x)\|_{L^2}^{i-1})^2-(x_{i+1}-x_i)^2(\|f(x)\|_{L^2}^{i})^2=C, \quad (4a)$$

$$(x_i-x_{i-1})^2(\|f(x)\|_{L^2}^{i-1})^2-D(x_{i+1}-x_i)^2(\|f(x)\|_{L^2}^{i})^2=0, \quad (4b)$$

or another form, wherein C and D can represent non-zero constants or variables. In some implementations, Dirichlet conditions can be used for the Poisson system, and the nodes at the ends of the domain can be fixed.

The non-linear systems of equations given in Equations (3) and (4) can be solved directly in a coupled manner using a non-linear iterative algorithm, such as Newton-Raphson or another iterative method. The example techniques take a different approach: instead of solving the coupled system for the N nodal locations and solution values directly, the example techniques include solving the full system in a stair-step manner. The example techniques can help accelerate convergence to the optimal grid distribution, while also enhancing the stability of the optimization process.

The example stair-step algorithm can be initialized with an initial grid that is smaller than the desired grid size. For example, the initial grid could be uniformly distributed if there is no a priori knowledge of nodes. As a specific example, the algorithm can start with an initial grid with N=2 nodes $x_1$ and $x_3$ and then generate and optimize the location of node $x_2$ using Equations (3) and (4) for N=3, for instance. Because this system only involves two degrees of freedom ($u_2$ and $x_2$), it can converge rapidly and it can be easier to maintain stability. The algorithm can proceed as follows:

For each element in the current grid, the solution and the nodal locations at the element endpoints can be fixed (e.g., such as the $x_1$ and $x_3$ in the previous example). Then, the optimal location of a new grid point that splits the element can be computed by solving the systems in Equations (3) and (4) locally (e.g., solving for $x_2$ that satisfies Equations (3) and (4)).

After each element has been split, the new grid can be globally optimized via Equations (3) and (4) using the local optimized grid as an initial solution.

This process can be repeated until the desired number of grid points is reached.

As described, for each new grid, all elements are split, and thus the final number of elements is $N_E=2^{N_{ref}} N_{E,0}$, where $N_{ref}$ is the desired number of refinements and $N_{E,0}$ is the number of elements for the starting grid. However, the algorithm can be extended to obtain any final grid point count. For example, not all elements need to be split at each refinement level, which relaxes the requirement for $N_E$ to be a power of 2.

FIGS. 4A-4K are plots 400*a-k* showing aspects of an example stair-step algorithm for optimizing a grid for a one-dimensional (1D) finite element solution. The example stair-step grid optimizing algorithm proceeds to obtain a final node count of N=17 grid points for a particular solution to the Poisson equation (e.g., $-u_{xx}=f(x)$). In each of the plots 400*a-k*, the exact solution (e.g., u) is shown as the solid line 401 as a reference, the FE node $x_i$ (e.g., points 402, 404 in FIG. 4A) is shown as a solid dot, the finite element (FE) solution is shown as the dash-dot line (e.g., line 451 in FIG. 4B) connecting the FE nodes, and the elemental errors (relative to the maximum elemental error in FIG. 4A) are shown as the dashed line (e.g., dashed line 403 in FIG. 4A).

Figure 4A:
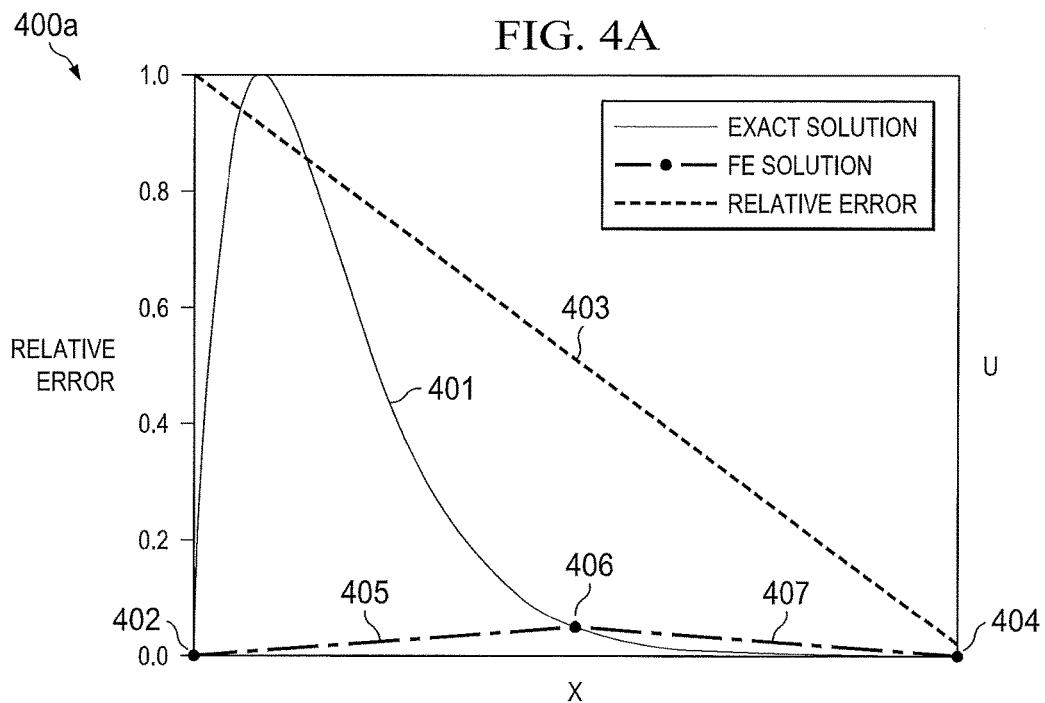
Figure 4B:
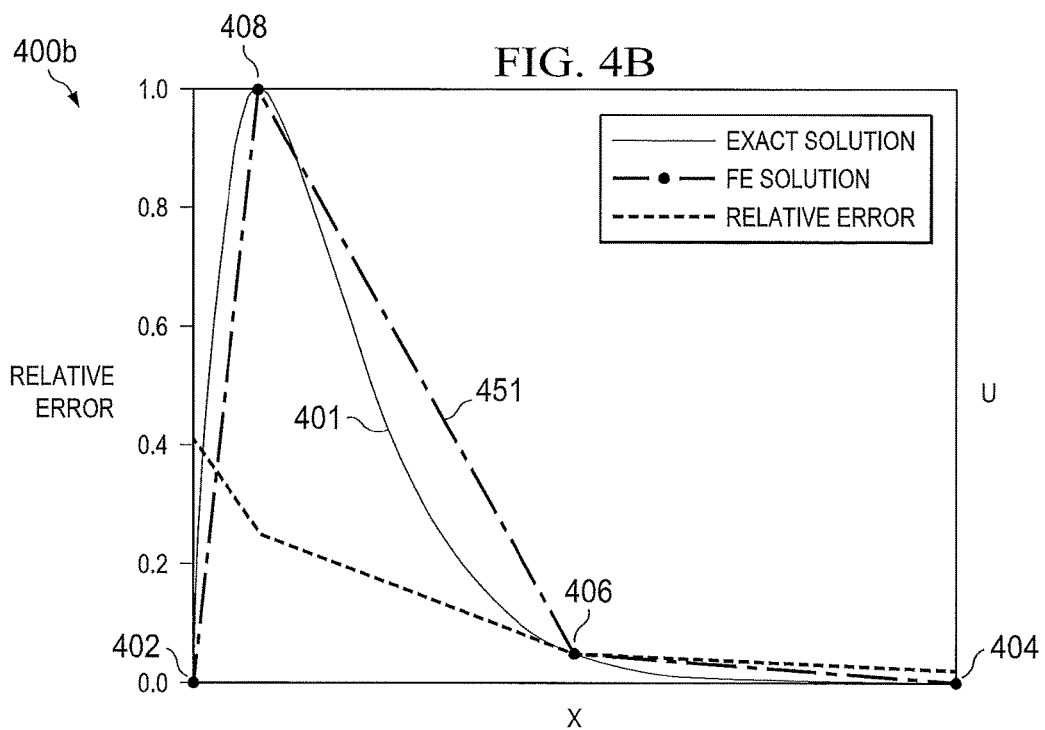

FIG. 4A shows an initial uniform grid or mesh of $N_{E,0}=2$ elements 405 and 407 with end points 402 and 406, and end points 406 and 404, respectively. FIG. 4B shows a locally optimized first addition of one node 408 between the end points 402 and 406 of the element 405. FIG. 4C shows a locally optimized second addition of node 410 between the end points 406 and 404 of the element 407. FIG. 4D shows a globally optimized grid including nodes 412, 414, 416, 418, and 420. These nodes can be obtained by a global optimization by solving the Equations (3) and (4) using the local optimized grid including nodes 402, 404, 406, 408, and 410 as an initial solution.

Figure 4I:
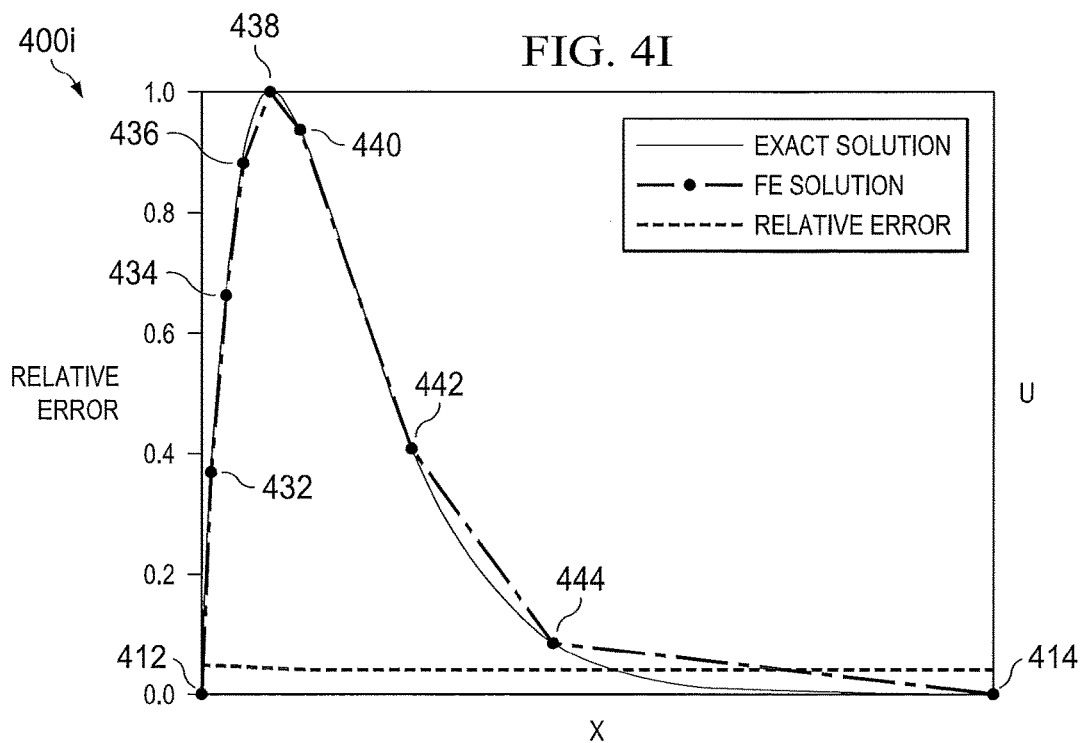

FIG. 4E-4I shows a next level of refinement. Specifically, FIGS. 4E-4H show four locally optimized additional nodes 422, 424, 426, and 428, while FIG. 4I shows a second global optimized grid including eight nodes 432, 434, 436, 438, 440, 442, 444, and 446 based on the locally optimized additional nodes 422, 424, 426, and 428 and the first globally optimized grid including nodes 412, 414, 416, 418.

Figure 4J:
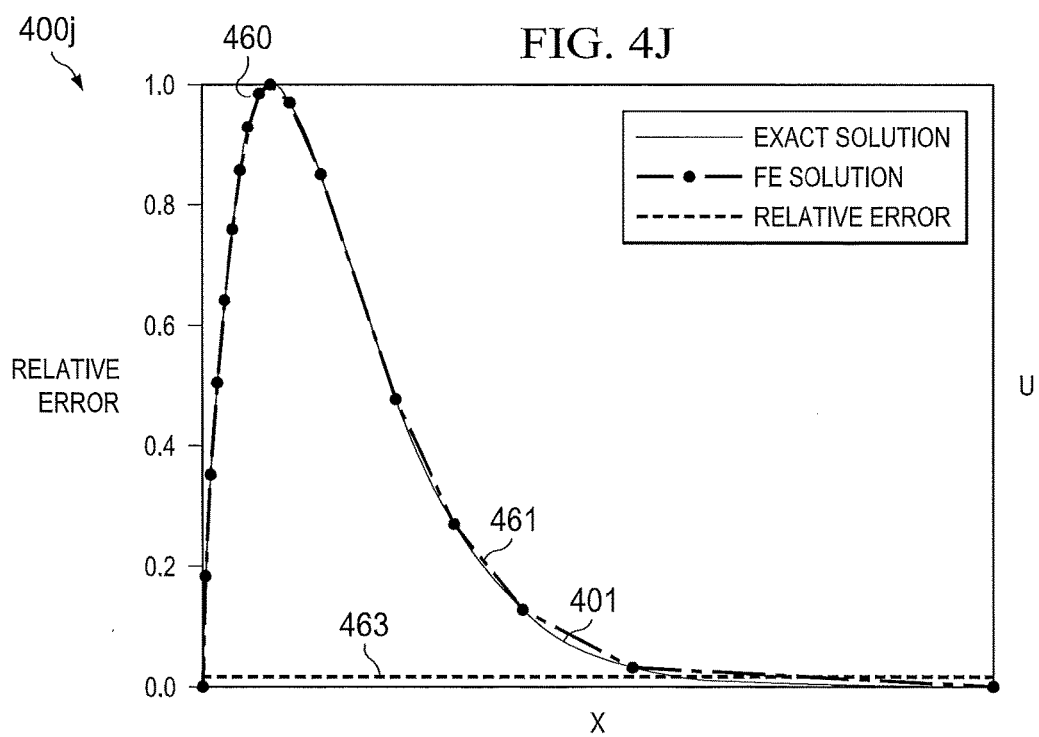

FIG. 4J shows a final optimal grid 460 obtained after another refinement process (e.g., splitting, local optimization, global optimization).

In other words, the example algorithm for optimizing a grid for a 1D finite element solution can proceed in stairs. Moving from stair k to the next stair (k+1), two stages of processes can be performed. In stage 1, a new node (or grid point) can be placed inside each of the elements of the stage k (i.e., in between each two successive points of the stage k). Thus, for example, if there are r nodes at the stair k, than after stage 1 of the stair k+1, 2r−1 nodes can be obtained. At stage 2 of the stair k+1, the locations of the 2k−3 points (in some instances, 2k−1 points by setting aside the two points at the boundaries) can be optimized, resulting in an optimal or optimized distribution of the 2k−3 nodes.

In some implementations, when proceeding along the stairs, say from stair k to stair k+1, it is not necessary to insert a new grid point inside each and every element. For example, if the desired number of nodes is 17 (i.e., 16 elements), the algorithm can start with 3 nodes (i.e., 2 elements), and insert 2 new nodes to generate 4 elements. Then insert another 2 nodes to the two leftmost elements, and insert 6 grid points into all of the elements, etc. Additional or different choices of which elements will get a new grid point can be implemented.

Figure 4K:
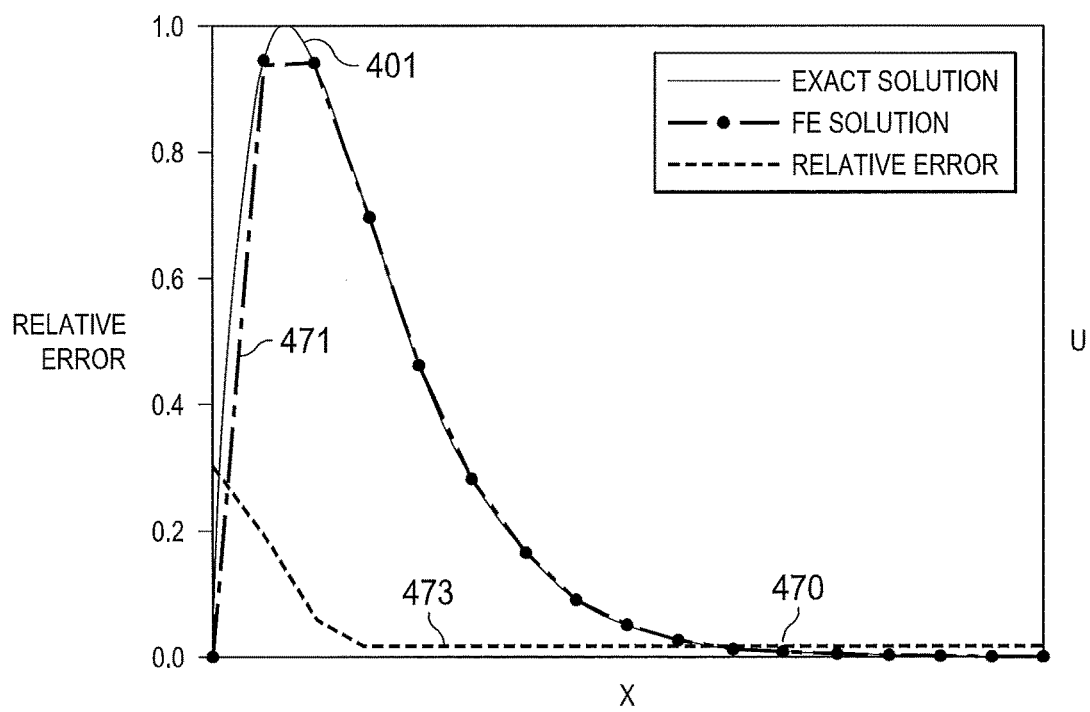

As illustrated by the elemental errors (e.g., represented by dashed line) in each figure, the errors are simultaneously lowered and become evenly distributed as the algorithm progresses. As a reference, FIG. 4K shows an FE solution 471 using a uniformly spaced grid 470. Comparing FIGS. 4J and 4K, the grid 460 obtained based on the example grid optimizing techniques gives significantly smaller error than the uniform grid 470 as shown in FIG. 4K. The uniform grid 470 has a significant error in the first element, whereas the optimized grid 460 has an evenly distributed smaller error as illustrated by the elemental error curve 463. The use of the optimized grid 460 for the FE solution in this example results in an error reduction of nearly 80% over the uniform grid 470.

As another example, the techniques can be applied to the steady state Burgers' equation, $$uu_x - \frac{1}{Re}u_{xx} = f(x).$$

The $i^{th}$ equation of the FE discretization of the Burgers' equation is similar to that of the Poisson equation, for example, as shown in Equation (5):

$$\left(C_{21}^{i-1} + \frac{1}{Re}K_{21}^{i-1}\right)u_{i-1} + \left(C_{22}^{i-1} + C_{11}^i + \frac{1}{Re}(K_{22}^{i-1} + K_{11}^i)\right)u_i + \left(C_{12}^i + \frac{1}{Re}K_{12}^i\right)u_{i+1} - F_2^{i-1} - F_1^i = 0, \quad (5)$$

The accompanying error equilibration system can be, for example, given by Equation (6):

$$(x_i - x_{i-1})^2(\|f(x) - uu_x\|_{L^2}^{i-1})^2 - (x_{i+1} - x_i)^2(\|f(x) - uu_x\|_{L^2}^i)^2 = 0 \quad (6).$$

Burgers' equation can provide a more rigorous test for the example techniques because now the FEM system of equations is also non-linear in the solution $u_j$ in addition to the nodal locations. For this example, the solution $$u = -2\tanh\left(\frac{xRe}{2L_{ref}}\right)$$

is chosen, where $$Re = \frac{u_{ref} L_{ref}}{v}$$

is the Reynolds number. Choosing $u_{ref}=2$ enforces $f(x)=0$.

Figure 5A:
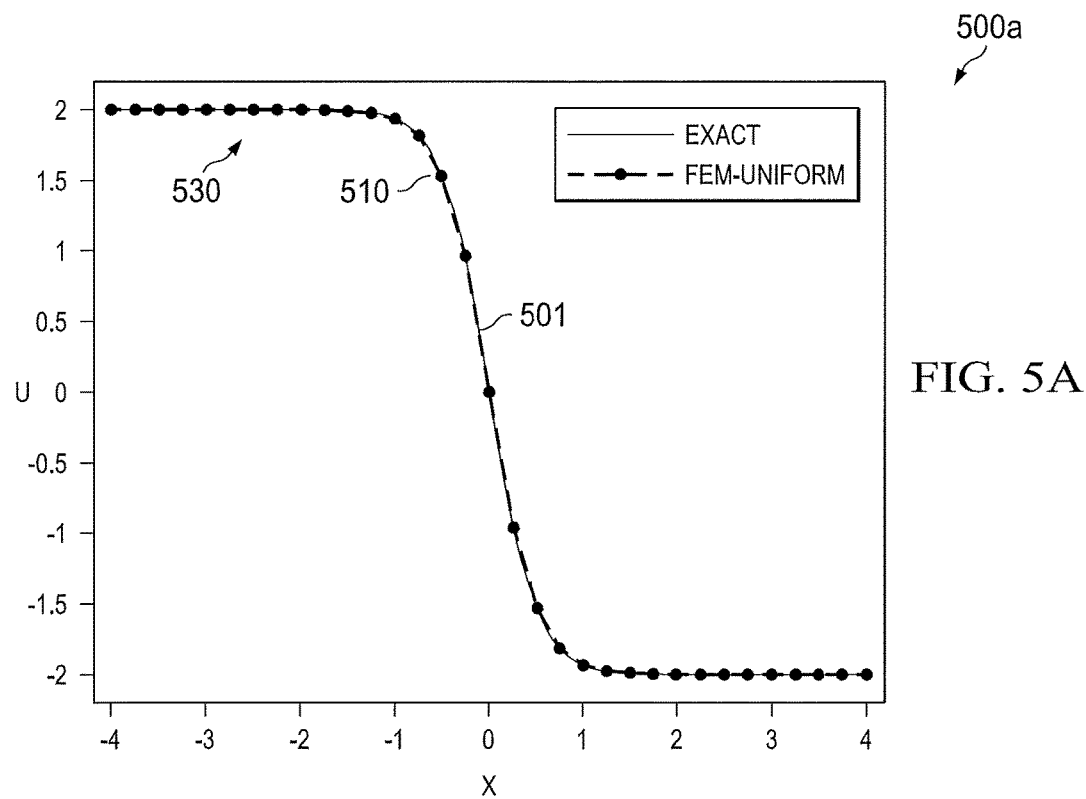
FIGS. 5A and 5B are plots showing aspects of an example grid optimizing algorithm applied to Burgers' Equation with a first set of parameters.
Figure 5B:
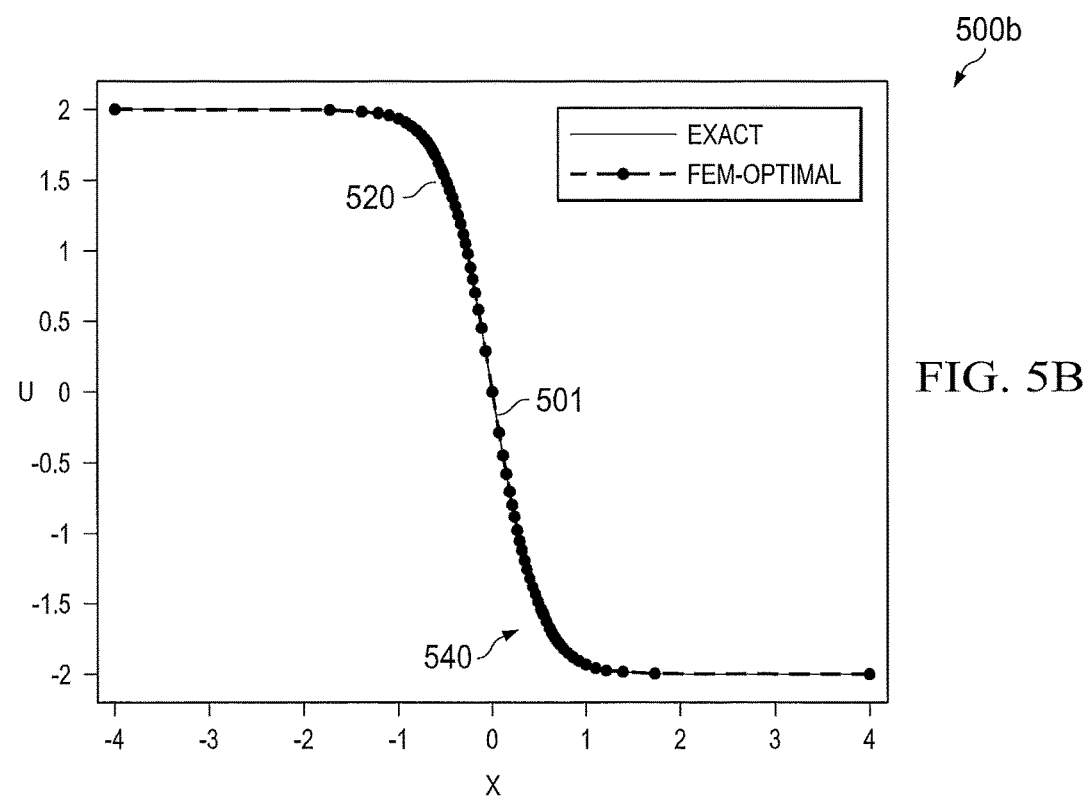

FIGS. 5A and 5B are plots 500a and 500b showing aspects of an example grid optimizing algorithm applied to Burgers' Equation for Re=32 and $L_{ref}=8$ using 32 elements. The example grid optimizing algorithm can be performed in the same or similar manner to the example stair-step grid optimizing algorithm described with respect to FIGS. 4A-4K. The exact solution is shown as the solid line 501 as a reference in both FIGS. 5A and 5B. FIG. 5A shows the FE solution 510 using a uniformly spaced grid 530 and FIG. 5B shows the FE solution 520 using an optimized or refined grid 540 obtained by the example grid optimizing algorithm. It can be seen that the uniform mesh 530 employs a large portion of elements where the corresponding FE solution 510 is relatively flat, which can be a waste. The FE solution 520 in FIG. 5B obtained based on the example grid optimizing algorithm pushes the nodes towards the sharp gradients, capturing the shock-like shape of the solution much more effectively and resulting in a 10× decrease in solution error (in the $L_\infty$ norm).

Figure 6A:
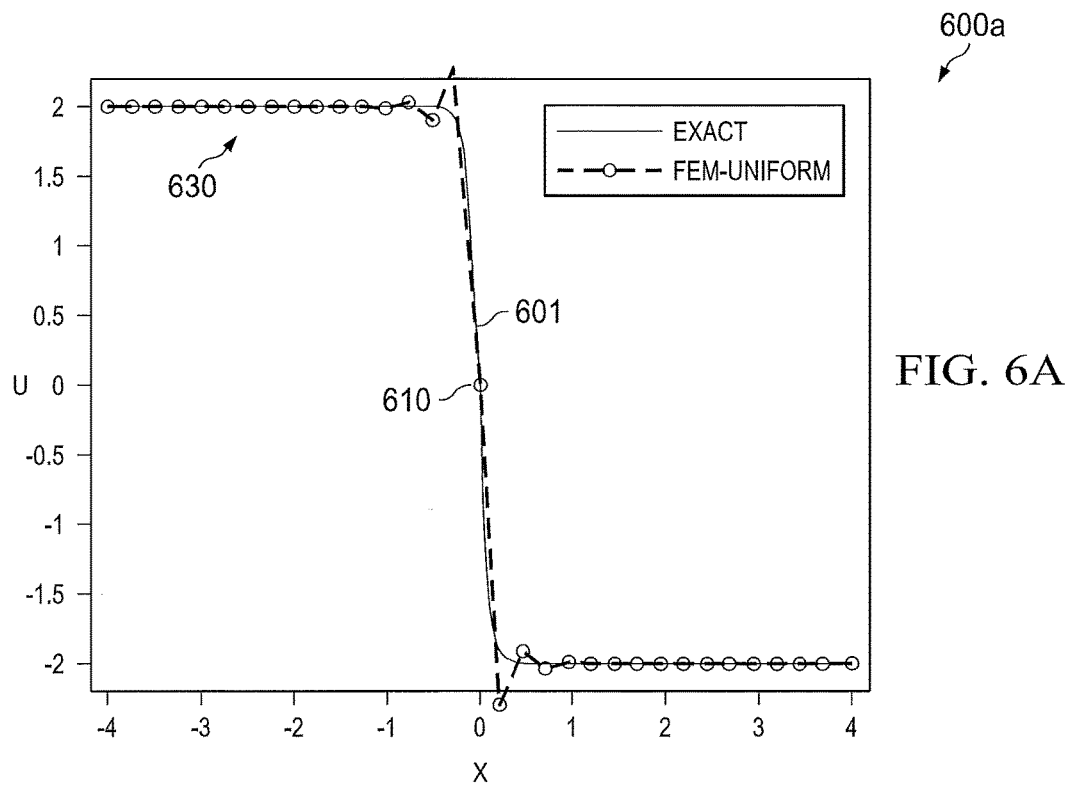
FIGS. 6A and 6B are plots showing aspects of an example grid optimizing algorithm applied to Burgers' Equation with a second set of parameters.
Figure 6B:
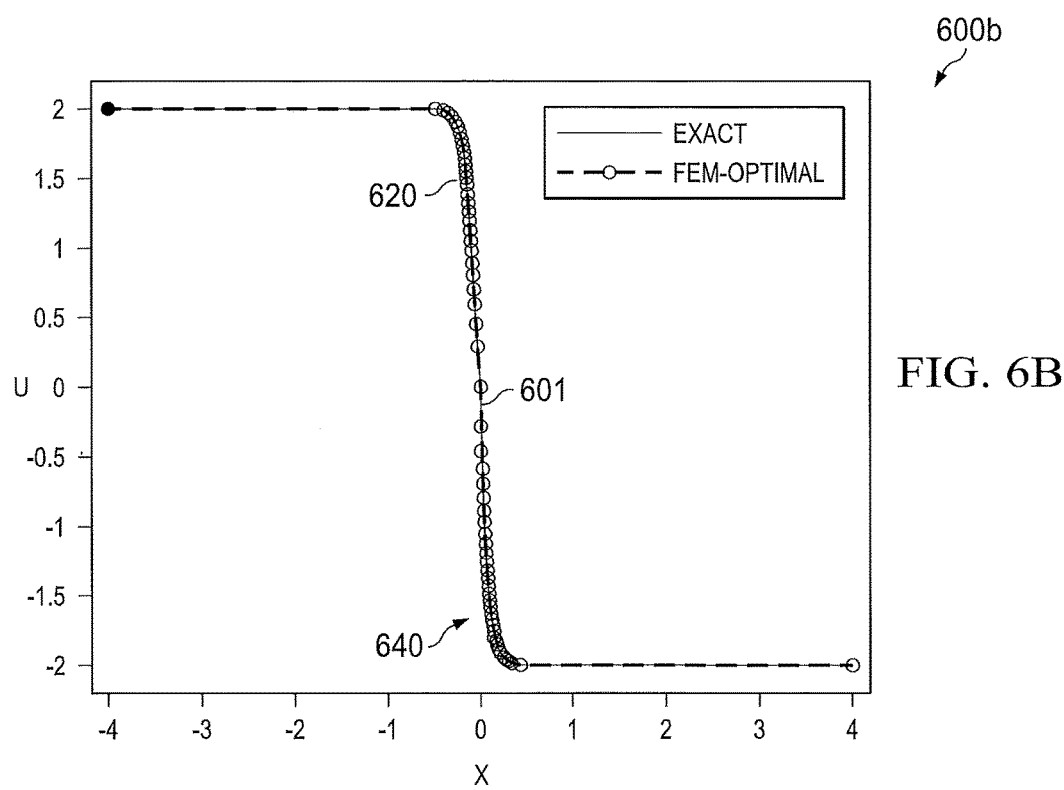

FIGS. 6A and 6B are plots 600a and 600b showing aspects of the example grid optimizing algorithm applied to Burgers' Equation for Re=128 and $L_{ref}=8$ using 32 elements. The exact solution is shown as the solid line 601 as a reference in both FIGS. 6A and 6B. FIG. 6A shows the FE solution 610 using a uniformly spaced grid 630 and FIG. 6B shows the FE solution 620 using an optimized or refined grid 640 obtained by the example grid optimizing algorithm. The comparison between FIGS. 6A and 6B is similar to the one between FIGS. 5A and 5B. In addition, the optimized grid 640 shown in FIG. 6B avoids under-resolution and oscillations characteristic of the Gibb's phenomenon resulting from the uniform grid 630 shown in FIG. 6A. In this case, the error of using the optimized grid is decreased by a factor of about 450 compared to using the uniform grid 630.

The example choices of Poisson equation and the Burgers' equation for the purpose of illustration demonstrate that the example grid optimizing techniques can adapt to both linear and non-linear types of governing equations typically associated with the hydraulic fracturing simulation. The example techniques can be adapted to additional or different applications.

The above-described 1D algorithm can be extended to 2D domains, for example, using the lines methodology. In some implementations, when a 2D partial differential equation needs to be solved in 2D domains, it can be geometrically discretized using a finite grid or mesh. Without losing generality, for example, the grid can include a grid of lines that are parallel to the Cartesian coordinate system. Additional or differently oriented or otherwise positioned lines can be used. The extension of the 1D algorithm to the 2D domain can be obtained through a proper implementation of the method of lines' family of algorithms, leading to a near-optimal gridding. For example, a 2D gridding algorithm can be obtained by using an approach similar to the alternating direction implicit (ADI) approach for implicit systems. As a representative example, consider the following 2D Poisson equation, $$-u_{xx} - u_{yy} = f(x,y), \quad (7)$$

on the domain $[0,1]^2$ with Dirichlet boundary conditions. The discretized form of the 2D Poisson equation can be similar to the 1D discretization in Equation (3) For this equation, an example local error indicator is given as $$\epsilon = \sum_K^{N_K} \eta_K = \sum_K^{N_K} A_K^2 \|f(x,y)\|_{L^2}^K, \quad (8)$$

where K is the element number, $N_K$ is the total number of elements, and $A_K$ is the area of the element. In some instances, an approximation to the minimum error for Equation 8) is to seek a distribution of the nodes such that the error is equally distributed among the elements, i.e., $\eta_1 = \eta_2 = \ldots = \eta_{N_K}$.

As an example, Equation (7) can be solved together with an error control system based on Equation (8) (e.g., an error control system that intends to equally distribute the error on a structured grid of bilinear quadrilateral elements). The lines methodology can be applied in a number of ways. One approach is to optimize the grid row-by-row repetitively or column-by-column repetitively or any combination of row-by-row and column-by-column. In this manner, the larger global optimization problem is broken up into several smaller, more manageable problems. The example algorithm can proceed row-by-row and/or column-by-column in a series of sweeps until the elemental error distribution is satisfactory (e.g., according to the error control system). The example algorithm can be extended to PDEs other than Equation (7) and error indicators other than Equation (8).

For clear illustration, index notation is used for the elements in the following. Thus, $A_{i,j}$ represents the area of element in the $i^{th}$ row and $j^{th}$ column. A single sweep of the algorithm can include:

For each grid row, iteratively solve the system of equations:

$$A_{i,j}^2 \|f(x, y)\|_{L^2}^{i,j} - A_{i,j+1} \|f(x, y)\|_{L^2}^{i,j+1} = 0, \quad (9)$$

$$j < N_{K,x}$$

$$\sum_{j=1}^{N_{K,x}} A_{i,j} - A_{i,total} = 0$$

where $N_{K,x}$ is the number of elements per row and $A_{i,total}$ is the initial area of row i which remains fixed due to geometric constraints. For each element in the row except for the most rightward element, shift the x position of the two nodes on the right to satisfy the newly computed areas. This step can be performed at the end of each iteration of Equation (9) to accelerate the convergence.

For each grid column, solve the system of equations:

$$A_{i,j}^2 \|f(x, y)\|_{L^2}^{i,j} - A_{i+1,j} \|f(x, y)\|_{L^2}^{i+1,j} = 0, \quad (10)$$

$$i < N_{K,y}$$

$$\sum_{i=1}^{N_{K,y}} A_{i,j} - A_{j,total} = 0$$

where $N_{K,y}$ is the number of elements per row and $A_{j,total}$ is the initial area of column j which remains fixed due to geometric constraints. For each element in the column except for the top element, shift the y position of the two nodes on the top of the element to satisfy the newly computed areas. This step can be performed at the end of each iteration of Equation (10) to accelerate the convergence.

Figure 7:
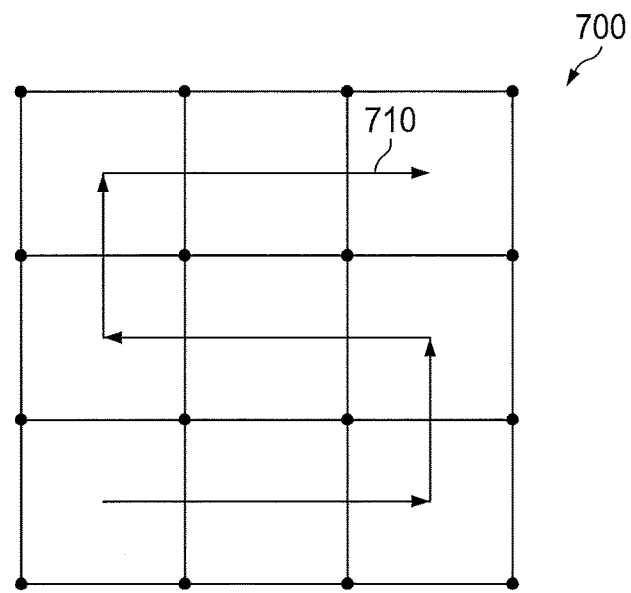
FIG. 7 is a plot showing an example snake pattern for traversing a two-dimensional (2D) domain.

The pattern to sweep or otherwise traverse the 2D domain can be generalized. For example, FIG. 7 is a plot 700 showing an example snake pattern 710 that starts at the lower left corner and sweeps through all the elements in 2D domain as indicated by the arrows. Additional or different patterns to sweep or traverse the 2D domain can be used.

For the example pattern shown in FIG. 7, the following system of equations can be solved iteratively:

$$A_{i,j}^2 \|f(x, y)\|_{L^2}^{i,j} - A_{i,j+1} \|f(x, y)\|_{L^2}^{i,j+1} = 0, \quad (11)$$

$$j < N_{K,x}$$

$$i \text{ odd}$$

$$A_{i,j+1}^2 \|f(x, y)\|_{L^2}^{i,j+1} - A_{i,j} \|f(x, y)\|_{L^2}^{i,j} = 0,$$

$$j > 1,$$

$$i \text{ even}$$

$$A_{i,N_{K,x}}^2 \|f(x, y)\|_{L^2}^{i,N_{K,x}} - A_{i+1,N_{K,x}} \|f(x, y)\|_{L^2}^{i+1,N_{K,x}} = 0,$$

-continued $$i < N_{K,y},$$

$$i \text{ odd}$$

$$A_{i,1}^2 \|f(x, y)\|_{L^2}^{i,1} - A_{i+1,1} \|f(x, y)\|_{L^2}^{i+1,1} = 0,$$

$$i < N_{K,y},$$

$$i \text{ even}$$

$$\sum_{i=1}^{N_{K,y}} \sum_{j=1}^{N_{K,x}} A_{i,j} - A_{total} = 0$$

After each iterative update of Equation (11), the nodes are updated in a similar manner as described above, following the prescribed pattern.

Figure 8:
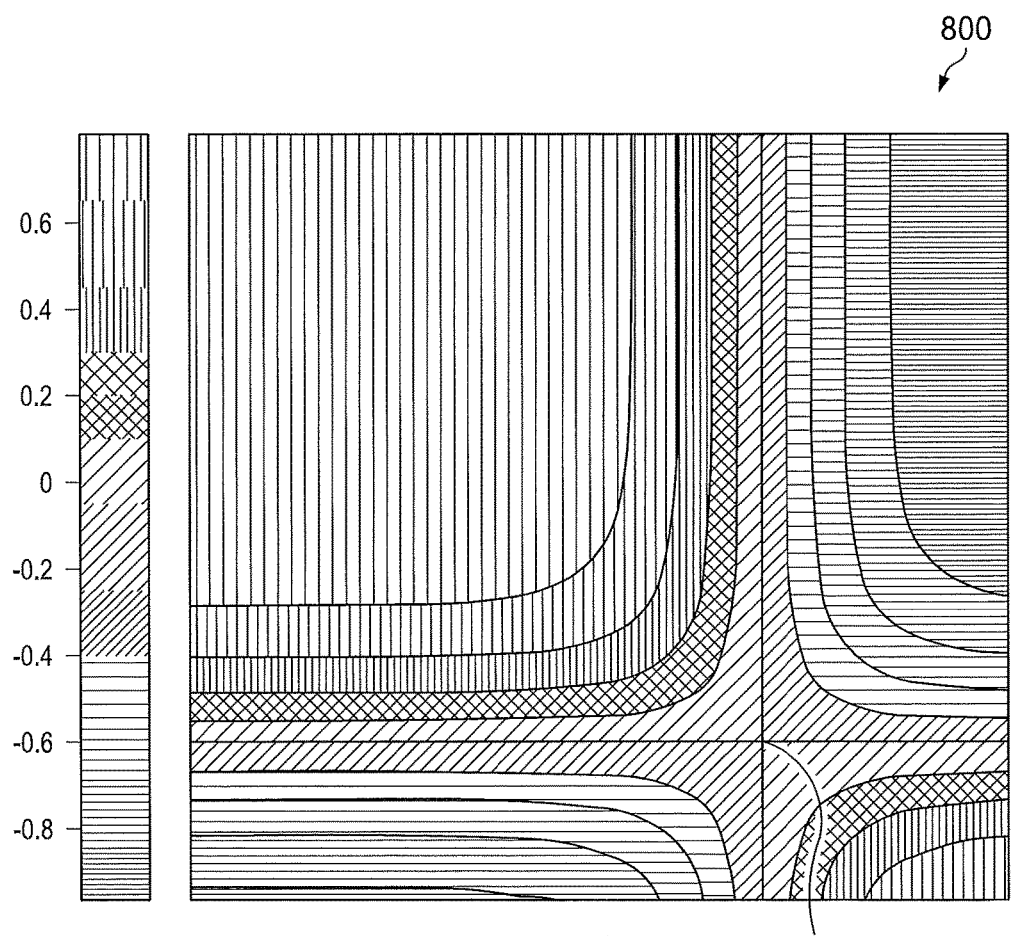
FIG. 8 is plot showing an example exact solution to a 2D Poisson equation.

FIG. 8 is plot 800 showing an example exact solution to a 2D Poisson equation. The example exact solution is u=~ tan h(7(x−0.7)) tan h(6(y−0.2)), including sharp gradients at point 820, (x,y)=(0.7,0.2).

Figure 9A:
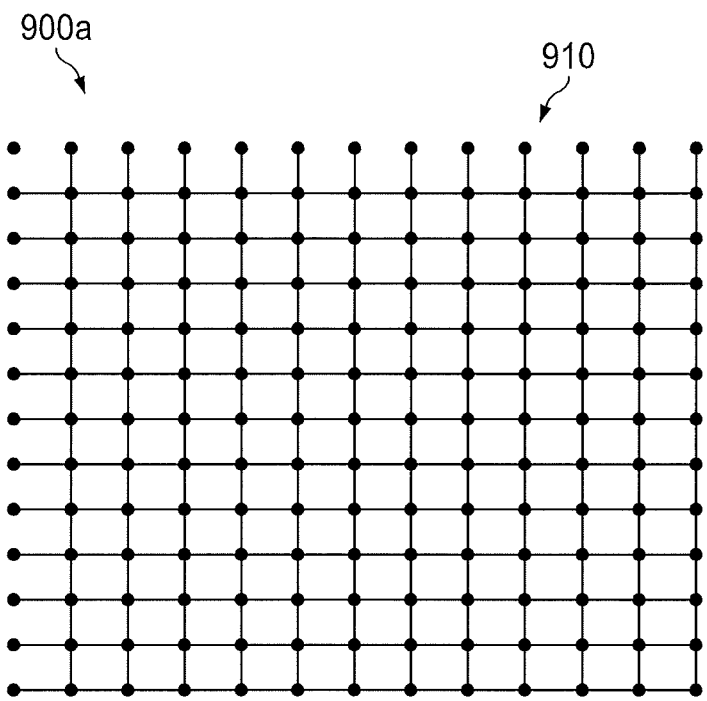
FIGS. 9A and 9B are plots showing aspects of an example grid optimization algorithm applied to the example 2D Poisson equation of FIG. 8.
Figure 9B:
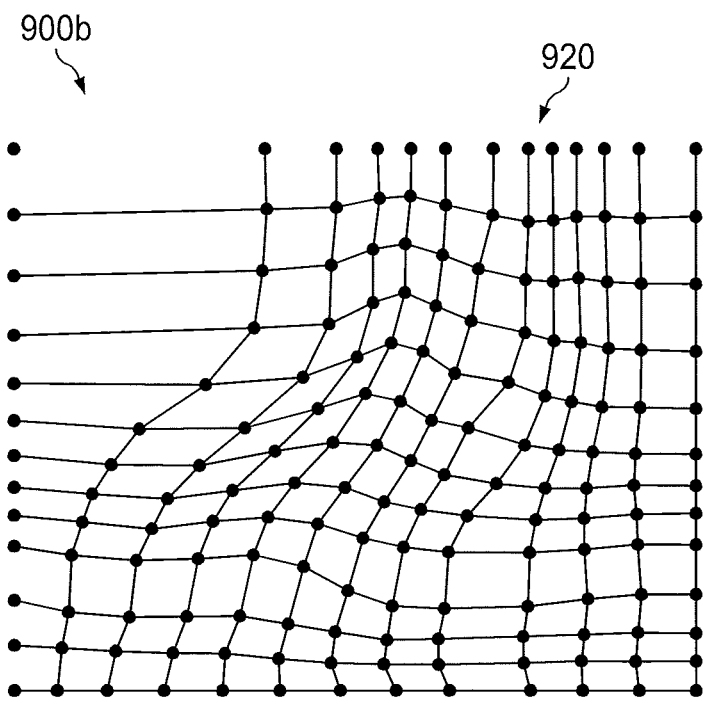

FIGS. 9A and 9B are plots 900a and 900b showing aspects of the example grid optimization algorithm applied to the example 2D Poisson equation of FIG. 8. A 13×13 quadrilateral grid is used for the grid optimization. FIG. 9A shows the initial uniform grid 910 and FIG. 9B shows the refined grid 920 after 7 sweeps according to the example techniques described with respect to Equations (7)-(10). As illustrated, the example grid refinement technique can lead the grid 920 to better align with the location of the sharp gradients as shown in FIG. 8. The refinement results in a 22% improvement of the error in the energy norm, with the error distributed more evenly over all the elements compared to the uniform grid.

Figure 10:
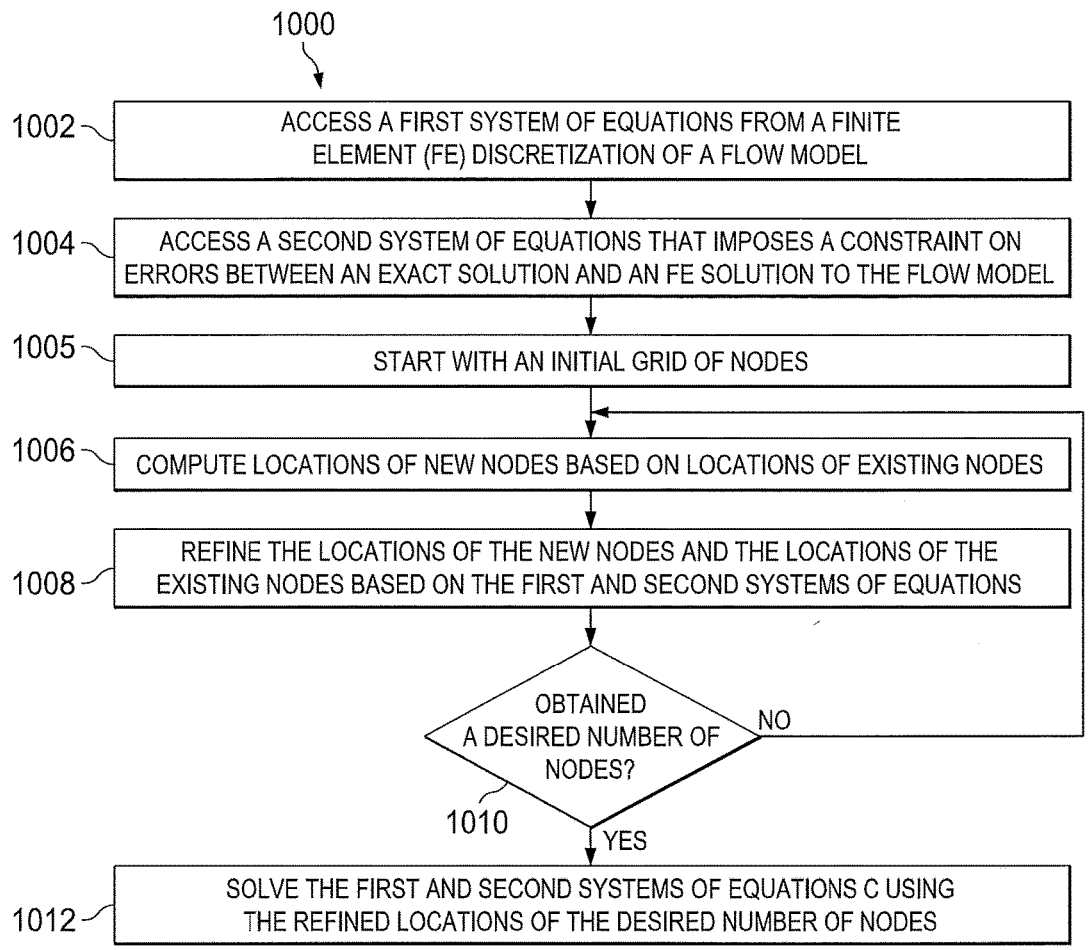
FIG. 10 is a flow chart showing an example process for optimizing a grid for finite element solutions of a flow model for fluid flow simulations.

FIG. 10 is a flow chart showing an example process 1000 for optimizing a grid for finite element solutions of a flow model for subterranean region simulations. The flow model can include the flow model 334 or other types of flow models that can model and simulate fluid flow, solid mechanics, fluid-solid interactions, or other properties of a subterranean region. All or part of the example process 1000 may be computer-implemented, for example, using the features and attributes of the example computing system 200 shown in FIG. 2 or other computing systems. The process 1000, individual operations of the process 1000, or groups of operations may be iterated or performed in parallel, in series, or in another manner. In some cases, the process 1000 may include the same, additional, fewer, or different operations performed in the same or a different order.

Optimizing a grid can include generating nodes (or grid points) and refining the locations of the nodes, for example, to satisfy an error constraint. In some implementations, the example process 1000 can be used to optimize a grid for a one-dimensional (1D) finite element solutions of a flow model that represents a flow path for well system fluid in a fracture or a wellbore in the subterranean region. The process 1000 may also be used to optimize grids for simulating other environments, for example, outside the context of a well system.

At 1002, a first system of equations from a finite element (FE) discretization of a flow model is accessed at a computer system. For instance, the computer system can access the first system of equations, for example, by reading them from a memory, a database or another medium, or by receiving them from a user interface, a communication link, or another source. The flow model can represent a flow path for well system fluid in a subterranean region. The first system of equations can be, for example, the example Equation (3), (5), or another system of equations.

At 1004, a second system of equations is accessed at the computer system. The second system of equations can be an error control equation (e.g., Equation (4) or (6)) that imposes a constraint on errors between an exact solution (e.g., solution $u_i$) and an FE solution (e.g., solution $x_i$) to the flow model. The FE solution including nodes (e.g., $\{x_i\}$) representing locations along the flow path for well system fluid in the subterranean region. The second system of equations can control the errors to be substantially equally or otherwise distributed among all the nodes.

In some implementations, locations for nodes are calculated in an iterative manner. For example, the locations for nodes are calculated in a stair-step manner including multiple levels of grid refinements according to the example techniques described with reference to FIGS. 4A-4K. Each level of grid refinement can include a local optimization and a global optimization.

At 1005, in some implementations, calculating the locations of the nodes can start with an initial grid. In some instances, the initial grid can include a smaller number of nodes than a desired number of nodes. The nodes in the initial grid can be uniformly or otherwise distributed. FIG. 4A shows an example initial grid including 3 uniformly distributed nodes 402, 406, and 404.

At 1006, for local optimization, locations of new nodes can be computed based on locations of existing nodes, for example, by computing the locations of the new nodes according to the first system of equations and the second system of equations based on the locations of existing nodes. As an example, a new node can split (or be inserted in between) a finite element of the existing grid; thus, the location of the new node can be in between locations of existing nodes. FIGS. 4B and 4C show an example local optimization of computing two new nodes 408 and 410 by solving the Equations (3) and (4) based on the locations of the initial nodes 402, 404, and 406. FIG. 4E-4H show another example of local optimization of a next level of refinement where locations of new nodes 422, 424, 426, and 428 are computed.

At 1008, for a particular level of grid refinement, the global optimization includes refining the locations of the new nodes (calculated during the local optimization of this level of grid refinement) and the locations of the existing nodes based on the first and second systems of equations. As a result, an updated grid is formed by the refined locations of the new nodes and existing nodes. For example, FIG. 4D shows an example global optimization of a first level of grid refinement, where an updated grid including nodes 412, 414, 416, 418, and 420 is obtained by refining the locations of the new nodes 408 and 410 and the initial nodes 402, 404, and 406. FIG. 4I show another global optimized grid including eight nodes by solving the Equations (3) and (4) using the locally optimized new nodes 422, 424, 426, and 428 and an existing grid including nodes 412, 414, 416, 418 as an initial solution.

At 1010, whether a desired number of nodes has been obtained is decided. The desired number of nodes can be a fixed number, for example, based on a default value or a user input, or it can be determined based on the error control equation or specifications of the error constraint. If the desired number of nodes have not been obtained, the example process 1000 can go back to 1006 to compute locations of new nodes based on the locations of the existing nodes. In some implementations, another termination condition other than the desired number of nodes can be used.

At 1012, if the desired number of nodes have been obtained, a final solution to the first and second systems of equations can be obtained using the refined locations of the desired number of nodes.

Figure 11:
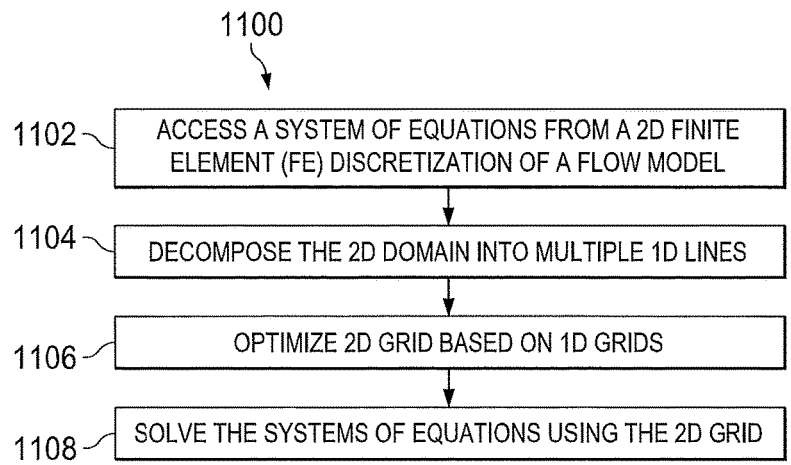
FIG. 11 is a flow chart showing an example process for optimizing a grid for 2D finite element solutions of a flow model for fluid flow simulations.

FIG. 11 is a flow chart showing an example process 1100 for optimizing a grid for two-dimensional (2D) finite element solutions of a flow model for subterranean region simulations. The process 1100 may also be used to optimize grids for simulating other environments, for example, outside the context of a well system. All or part of the example process 1100 may be computer-implemented, for example, using the features and attributes of the example computing system 200 shown in FIG. 2 or other computing systems. The process 1100, individual operations of the process 1100, or groups of operations may be iterated or performed in parallel, in series, or in another manner. In some cases, the process 1100 may include the same, additional, fewer, or different operations performed in the same or a different order.

At 1102, a system of equations from a 2D finite element (FE) discretization of a flow model is accessed at a computer system. The flow model can include a 2D model representing, for example, a flow path and steady state of well system fluid in a reservoir in the subterranean region. An example 2D flow model can include a 2D Poisson equation as shown in Equation (7). The 2D flow model and its 2D FE discretization can span a 2D domain, and a 2D grid can be obtained for 2D FE solutions of a flow model.

In some implementations, the system of equations from the 2D FE discretization can include or otherwise be coupled with a 2D error control system, for example, based on an error indicator system (e.g., the error indication system in Equation (8)). As such, an augmented 2D system of equations (e.g., system of equation (9), (10), or (11)) can be formed. An FE solution to the 2D flow model can be approached by solving for the augmented 2D system of equations (e.g., solving the system of equations from 2D FE discretization subject to the 2D error control system).

At 1104, the 2D domain can be decomposed into multiple 1D lines, for example, using the example techniques described with respect to equations (7)-(11) or other techniques. After the decomposition, the 1D gridding algorithm(s) (e.g., as described with respect to FIGS. 4A-4K) can be implemented iteratively along the 1D lines for the 2D gridding problems. For instance, the 2D domain can be decomposed into a grid of intersecting lines. The lines can be, for example, parallel to, orthogonal to, or otherwise oriented with respect to the Cartesian coordinate system or other coordinate systems of the 2D domain. Additional or different techniques can be used to decompose the 2D domain. As a result, the 2D domain can include multiple rows and columns, for example, as shown in FIG. 7.

At 1106, a 2D grid can be optimized based on 1D grids obtained along the rows and columns of the 2D dimension. For instance, the 2D domain can be traversed by following a sweep pattern in a row-by-row, column-by-column, a snake-pattern (e.g., as shown in FIG. 7) or another manner, such as a combination of the above manners. Example techniques for each sweep along a single dimension are described with reference to systems of equations (9)-(11). In some implementations, by keeping one dimension (e.g., along the column) fixed and solving along the other dimension (e.g., along the row), a 1D grid can be obtained and optimized, for example, according to the example process 1000. When some or all rows and columns of the 2D dimensions have been traversed, a 2D grid can be obtained by aggregating all the obtained 1D grids.

As an example, when using the row-by-row sweep pattern for the 2D domain, the algorithm can swap through all the grid's rows in the computational domain, for example in a well-defined order, say from row 1 to row n, and where for each row k (1<k<n) the 1D gridding algorithm can be used, and where the location of the grid points at the row k−1 are the new values, and those of the row k+1 are the settled values from the previous iteration. After the sweep is completed, the algorithm can start a new iteration. The first row to be considered for the new iteration can be k=2, assuming the values at k=3 are taken from the previous iteration. The 2D row-by-row sweep can continue till convergence. A similar approach can be implemented for the column-by-column method. In some implementations, in order to accelerate the rate of convergence of the final grid, a line can be drawn that connects all the grid points in the computational domain. The 1D algorithm may be implemented on the grid points along this line, where the values at the grid points that are off this line at a specific point, are considered in an explicit manner. The process suggests solving for the values at the grid points that are on the line iteratively till convergence. Several lines can be drawn through all the grid points in the 2D domain. In some implementations, an optimal line that achieve the best rate of convergence of the iterative process can be found.

At 1108, a 2D solution to the augmented 2D system of equations can be obtained using the 2D grid. In some implementations, the obtained 2D solution can be used as an initial or updated solution to repeat the above operations 1106 and 1108 for optimizing the 2D grid and thus improving the 2D solution, for example, until a terminating condition (e.g., a desired error condition) is reached.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of examples have been described. Nevertheless, it will be understood that various modifications can be made. Accordingly, other implementations are within the scope of the following claims.

The invention claimed is:

1. A subterranean region simulation method comprising:
accessing, at a computer system, a first system of equations from a finite element (FE) discretization of a flow model, the flow model representing a flow path for well system fluid in a subterranean region;
accessing, at the computer system, a second system of equations that imposes a constraint on errors between an exact solution and an FE solution to the flow model, the FE solution including nodes representing locations along the flow path for well system fluid in the subterranean region;
computing, by operation of the computer system, locations of the nodes in an iterative manner by:
computing locations of new nodes based on locations of existing nodes; and
refining the locations of the new nodes and the locations of the existing nodes based on the first and second systems of equations; and
performing an injection treatment using the flow model solved by the FE solution.

2. The subterranean region simulation method of claim 1, wherein computing locations of the nodes in an iterative manner comprises using a smaller number of nodes than a desired number of nodes as an initial set of nodes.

3. The subterranean region simulation method of claim 2, wherein locations of the initial set of nodes are uniformly distributed.

4. The subterranean region simulation method of claim 1, wherein computing locations of new nodes based on locations of existing nodes comprises computing a location of a new node that is between locations of existing nodes.

5. The subterranean region simulation method of claim 1, wherein the second system of equations controls the errors between the exact solution and the FE solution to the flow model to be substantially equally distributed among all the nodes.

6. The subterranean region simulation method of claim 1, wherein the first system of equations is obtained from a one-dimensional FE discretization of the flow model.

7. The subterranean region simulation method of claim 1, wherein the second system of equations is obtained from a two-dimensional FE discretization of the flow model.

8. The subterranean region simulation method of claim 7, wherein computing locations for nodes in an iterative manner comprises computing locations of the nodes in one or more of a row-by-row, a column-by-column, or a snake-pattern manner.

9. A non-transitory computer-readable medium storing instructions that, when executed by data processing apparatus, cause the data processing apparatus to perform operations comprising:
accessing a first system of equations from a finite element (FE) discretization of a flow model, the flow model representing a flow path for well system fluid in a subterranean region;
accessing a second system of equations that imposes a constraint on errors between an exact solution and an FE solution to the flow model, the FE solution including nodes representing locations along the flow path for well system fluid in the subterranean region;
computing locations of the nodes in an iterative manner by:
computing locations of new nodes based on locations of existing nodes; and
refining the locations of the new nodes and the locations of the existing nodes based on the first and second systems of equations; and
performing an injection treatment using the flow model solved by the FE solution.

10. The non-transitory computer-readable medium of claim 9, wherein computing locations of the nodes in an iterative manner comprises using a smaller number of nodes than a desired number of nodes as an initial set of nodes.

11. The non-transitory computer-readable medium of claim 9, wherein computing locations of new nodes based on locations of existing nodes comprises computing a location of a new node that is between locations of existing nodes.

12. The non-transitory computer-readable medium of claim 9, wherein the second system of equations controls the errors between the exact solution and the FE solution to the flow model to be substantially equally distributed among all the nodes.

13. The non-transitory computer-readable medium of claim 9, wherein the second system of equations is obtained from a two-dimensional FE discretization of the flow model.

14. The non-transitory computer-readable medium of claim 13, wherein computing locations for nodes in an iterative manner comprises computing locations of the nodes in one or more of a row-by-row, a column-by-column, or a snake-pattern manner.

15. A computing system comprising:
data processing apparatus; and
memory storing computer-readable instructions that, when executed by the data processing apparatus, cause the data processing apparatus to perform operations comprising:
accessing a first system of equations from a finite element (FE) discretization of a flow model, the flow model representing a flow path for well system fluid in a subterranean region;
accessing a second system of equations that imposes a constraint on errors between an exact solution and an FE solution to the flow model, the FE solution including nodes representing locations along the flow path for well system fluid in the subterranean region;
computing locations of the nodes in an iterative manner by:
computing locations of new nodes based on locations of existing nodes; and
refining the locations of the new nodes and the locations of the existing nodes based on the first and second systems of equations; and performing an injection treatment using the flow model solved by the FE solution.

16. The computing system of claim 15, wherein computing locations of the nodes in an iterative manner comprises using a smaller number of nodes than a desired number of nodes as an initial set of nodes.

17. The computing system of claim 15, wherein computing locations of new nodes based on locations of existing nodes comprises computing a location of a new node that is between locations of existing nodes.

18. The computing system of claim 15, wherein the second system of equations controls the errors between the exact solution and the FE solution to the flow model to be substantially equally distributed among all the nodes.

19. The computing system of claim 15, wherein the second system of equations is obtained from a two-dimensional FE discretization of the flow model and/or a solid model.

20. The computing system of claim 19, wherein computing locations of the nodes in an iterative manner comprises computing locations of the nodes in one or more of a row-by-row, a column-by-column, or a snake-pattern manner.

* * * * *

UNITED STATES PATENT AND TRADEMARK OFFICE
CERTIFICATE OF CORRECTION

PATENT NO. : 9,739,907 B2
APPLICATION NO. : 15/108730
DATED : August 22, 2017
INVENTOR(S) : Joshua L Camp and Avi Lin Page 1 of 1

It is certified that error appears in the above-identified patent and that said Letters Patent is hereby corrected as shown below:

In the Specification

In Column 13, Line 5, delete formula "$K_{21}{}^{i-1}u_{i-1} + (K_{22}{}^{i-1} + K_{11}{}^i)u_i + K_{12}{}^i u_{i+1} - F_2{}^{i-1} - F_1{}^i = 0$,"
and insert -- $K_{21}^{i-1}u_{i-1} + (K_{22}^{i-1} + K_{11}^i)u_i + K_{12}^i u_{i+1} - F_2^{i-1} - F_1^i = 0$ --

In Column 13, Line 8, delete formula "$(x_i - x_{i-1})^2 (\|f(x)\|_{L^2}{}^{i-1})^2 - (x_{i+1} - x_i)^2 (\|f(x)\|_{L^2}{}^i)^2 = 0$,"
and insert -- $(x_i - x_{i-1})^2 (\|f(x)\|_{L^2}^{i-1})^2 - (x_{i+1} - x_i)^2 (\|f(x)\|_{L^2}^i)^2 = 0$ --

In Column 13, Line 25, delete formula "$(x_i - x_{i-1})^2 (\|f(x)\|_{L^2}{}^{i-1})^2 - (x_{i+1} - x_i)^2 (\|f(x)\|_{L^2}{}^i)^2 = C$,"
and insert -- $(x_i - x_{i-1})^2 (\|f(x)\|_{L^2}^{i-1})^2 - (x_{i+1} - x_i)^2 (\|f(x)\|_{L^2}^i)^2 = C$, --

In Column 13, Line 27, delete formula "$(x_i - x_{i-1})^2 (\|f(x)\|_{L^2}{}^{i-1})^2 - D(x_{i+1} - x_i)^2 (\|f(x)\|_{L^2}{}^i)^2 = 0$,"
and insert -- $(x_i - x_{i-1})^2 (\|f(x)\|_{L^2}^{i-1})^2 - D(x_{i+1} - x_i)^2 (\|f(x)\|_{L^2}^i)^2 = 0$, --

In Column 15, Line 30-31, delete formula "$(x_i - x_{i-1})^2 (\|f(x) - uu_x\|_{L^2}{}^{i-1})^2 - (x_{i+1} - x_i)^2 (\|f(x) - uu_x\|_{L^2}{}^i)^2 = 0$,"
and insert -- $(x_i - x_{i-1})^2 (\|f(x) - uu_x\|_{L^2}^{i-1})^2 - (x_{i+1} - x_i)^2 (\|f(x) - uu_x\|_{L^2}^i)^2 = 0$ --

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*